US011664925B2

(12) United States Patent
Huang et al.

(10) Patent No.: US 11,664,925 B2
(45) Date of Patent: *May 30, 2023

(54) HIGH EFFICIENCY (HE) BEACON AND HE FORMATS

(71) Applicant: Intel Corporation, Santa Clara, CA (US)

(72) Inventors: Po-Kai Huang, San Jose, CA (US); Feng Jiang, Sunnyvale, CA (US); Xiaogang Chen, Hillsboro, OR (US); Qinghua Li, San Ramon, CA (US); Robert J. Stacey, Portland, OR (US); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/199,861

(22) Filed: Mar. 12, 2021

(65) Prior Publication Data

US 2021/0203439 A1 Jul. 1, 2021

Related U.S. Application Data

(63) Continuation of application No. 16/382,531, filed on Apr. 12, 2019, now Pat. No. 10,979,169.
(Continued)

(51) Int. Cl.
*H04L 1/00* (2006.01)
*H04W 40/24* (2009.01)
(Continued)

(52) U.S. Cl.
CPC ......... *H04L 1/0005* (2013.01); *H04W 40/244* (2013.01); *H04W 72/0446* (2013.01); *H04W 80/02* (2013.01); *H04W 84/12* (2013.01)

(58) Field of Classification Search
CPC .............. H04L 1/0025; H04W 40/244; H04W 72/0446; H04W 80/02; H04W 84/12
See application file for complete search history.

(56) References Cited

U.S. PATENT DOCUMENTS 9,900,878 B2   2/2018  Seok
10,791,516 B1* 9/2020  Chu ................. H04W 72/0446
(Continued)

OTHER PUBLICATIONS

U.S. Appl. No. 16/382,531, filed Apr. 12, 2019, High Efficiency (HE) Beacon and HE Formats.
(Continued)

*Primary Examiner* — Melanie Jagannathan
(74) *Attorney, Agent, or Firm* — Schwegman Lundberg & Woessner, P.A.

(57) ABSTRACT

Methods, apparatuses, and computer readable media for high efficiency (HE) beacon and HE formats in a wireless network are disclosed. An apparatus of a high efficiency (HE) access point (AP), where the apparatus comprises processing circuitry configured select a <HE-MCS, NSS=1> tuple from the basic HE-MCS set of tuples, if a basic HE modulation and control scheme (MCS) (HE-MCS) and a number of spatial streams (NSS) set of tuples is not empty, and otherwise select the <HE-MCS, NSS=1> tuple from a mandatory HE-MCS and NSS set of tuples. The processing circuitry may be further configured to encode a beacon frame in a HE single user (SU) physical layer (PHY) protocol data unit (PPDU), in accordance with the selected <HE-MCS, NSS=1> tuple, and configure the HE AP to transmit the HE SU PPDU. Null data packets formats, methods, computer readable media, and apparatuses are disclosed for multiple 20 MHz operations.

20 Claims, 15 Drawing Sheets

Related U.S. Application Data

(60) Provisional application No. 62/659,827, filed on Apr. 19, 2018, provisional application No. 62/657,148, filed on Apr. 13, 2018.

(51) Int. Cl.
*H04W 80/02* (2009.01)
*H04W 72/04* (2023.01)
*H04W 84/12* (2009.01)
*H04W 72/0446* (2023.01)

(56) References Cited

U.S. PATENT DOCUMENTS

| | | |
|---|---|---|
| 2014/0307653 A1 | 10/2014 | Liu et al. |
| 2016/0050659 A1 | 2/2016 | Seok |
| 2016/0143006 A1 | 5/2016 | Ghosh et al. |
| 2016/0285608 A1 | 9/2016 | Kwon et al. |
| 2017/0303164 A1* | 10/2017 | Chu ............... H04W 72/042 |
| 2018/0124866 A1 | 5/2018 | Asterjadhl et al. |
| 2018/0279209 A1* | 9/2018 | Fang ................ H04L 5/005 |
| 2019/0238259 A1* | 8/2019 | Huang .............. H04L 1/0009 |
| 2019/0260531 A1* | 8/2019 | Chen ................ H04L 5/0041 |
| 2022/0408349 A1* | 12/2022 | Kneckt .............. H04W 8/005 |

OTHER PUBLICATIONS

"U.S. Appl. No. 16/382,531, Non Final Office Action dated Jul. 9, 2020", 8 pgs.

"U.S. Appl. No. 16/382,531, Notice of Allowance dated Dec. 10, 2020", 8 pgs.

"U.S. Appl. No. 16/382,531, Response filed Oct. 7, 2020 to Non Final Office Action dated Jul. 9, 2020", 7 pgs.

* cited by examiner

HIGH EFFICIENCY (HE) BEACON AND HE FORMATS

PRIORITY CLAIM

This application is a continuation of U.S. patent application Ser. No. 16/382,531, filed Apr. 12, 2019, which claims the benefit of priority under 35 USC 119(e) to U.S. Provisional Patent Application Ser. No. 62/657,148, filed Apr. 13, 2018, and to U.S. Provisional Patent Application Ser. No. 62/659,827, filed Apr. 19, 2018, which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to beacon methods and formats and null data packet (NDP) methods and formats.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
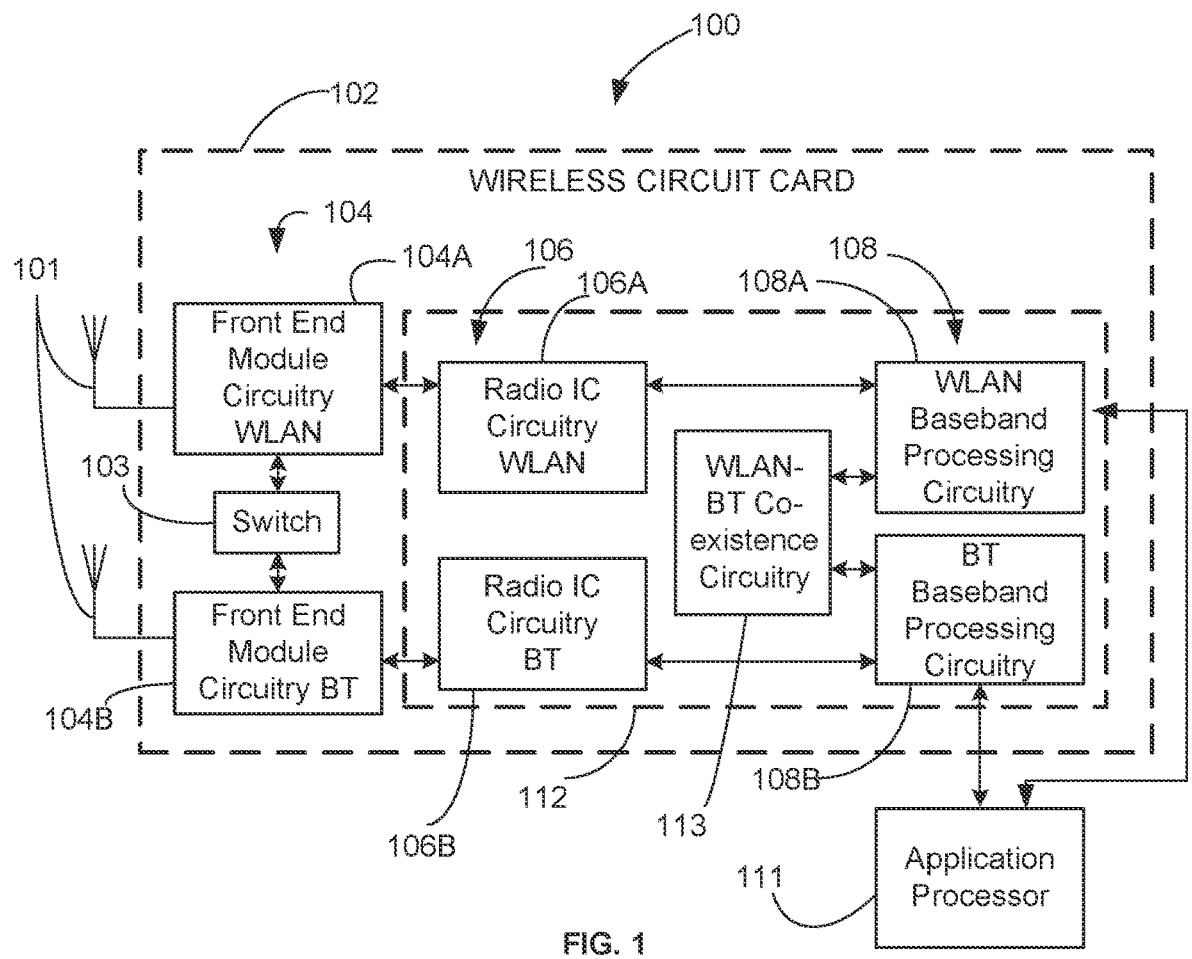
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
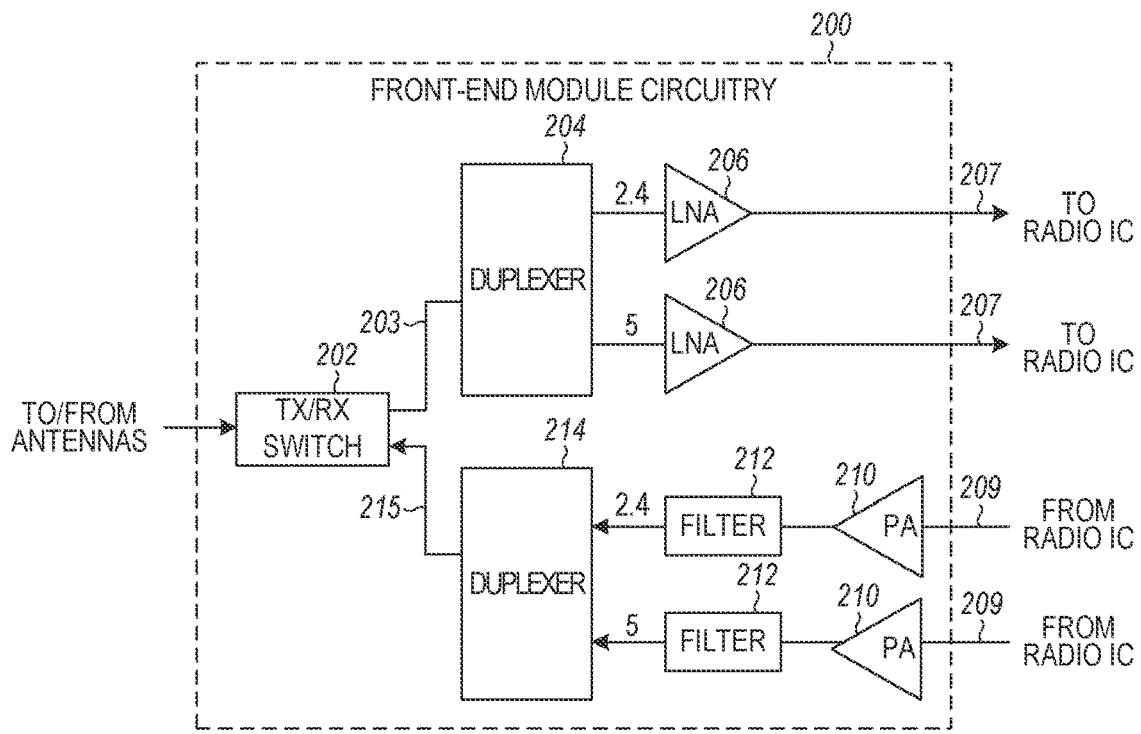
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
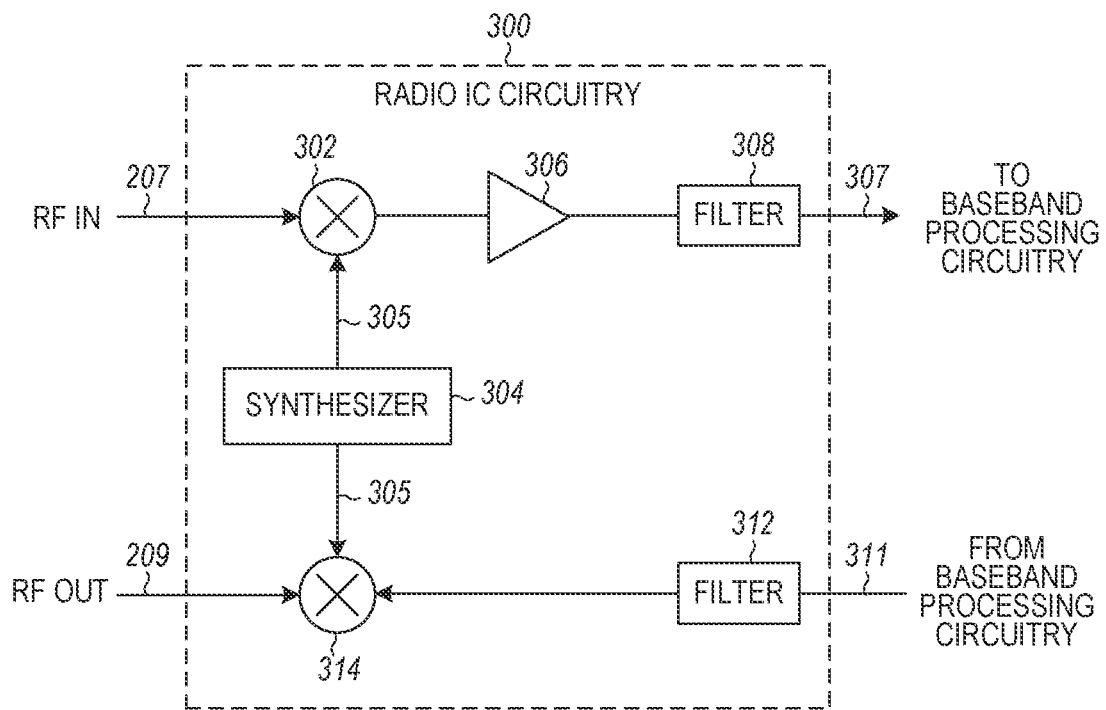
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
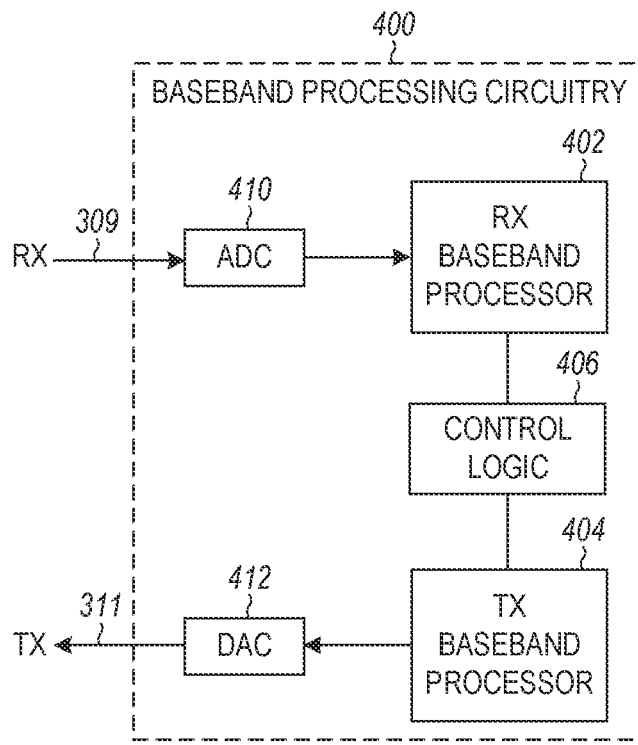
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
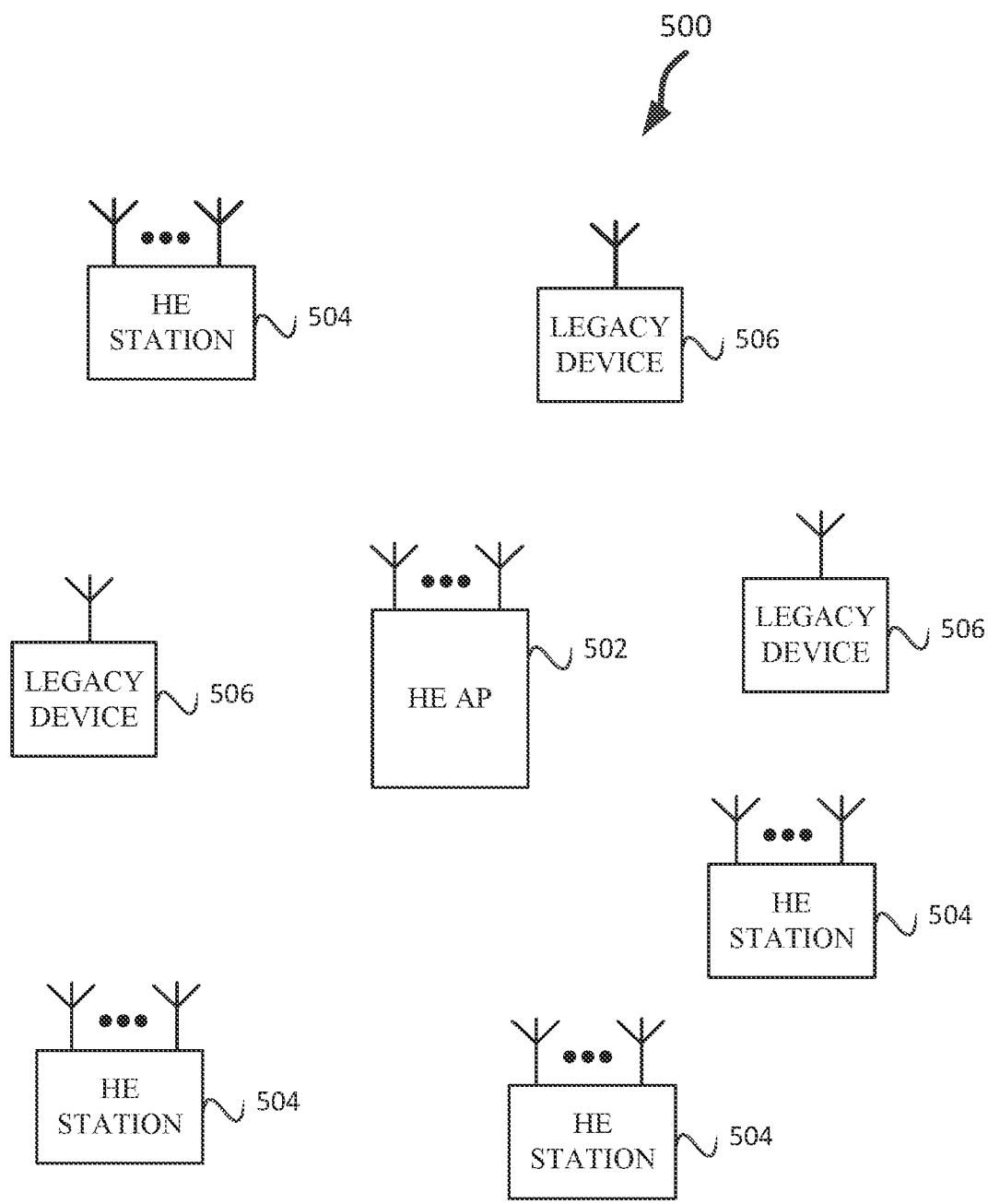
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.11ax) stations (STAs) 504, and a plurality of legacy (e.g., IEEE 802.11g/n/ac) devices 506. In some embodiments, the HE STAs 504 and/or HE AP 502 are configured to operate in accordance with IEEE 802.11 extremely high throughput (EHT). In some embodiments, the HE STAs 504 and/or HE AP 520 are configured to operate in accordance with IEEE 802.11az. In some embodiments, IEEE 802.11EHT may be termed Next Generation 802.11. In some embodiments, the HE AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 504 may not be able to decode the beacon frames and thus are not able to operate in a ER BSS. The BSSs, e.g., BSS, ER BSS, and HE BSS, may used different BSSIDs.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. HE AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the HE AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the HE STAs 504 may be termed extremely high throughput (EHT) stations or stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g., IEEE 802.11EHT/ax embodiments, a HE AP 502 may operate as a master station which may be arranged to contend for a wireless medium (e.g., during a contention period) to receive exclusive control of the medium for a transmission opportunity (TXOP). The HE AP 502 may transmit an EHT/HE trigger frame transmission, which may include a schedule for simultaneous UL transmissions from HE STAs 504. The HE AP 502 may transmit a time duration of the TXOP and sub-channel information. During the TXOP, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the HE AP 502 may communicate with HE stations 504 using one or more HE or EHT frames. During the TXOP, the HE STAs 504 may operate on a sub-channel smaller than the operating range of the HE AP 502. During the TXOP, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 or IEEE 802.11EHT/ax communication techniques, although this is not a requirement.

In some embodiments the HE station 504 may be a "group owner" (GO) for peer-to-peer modes of operation. A wireless device may be a HE station 502 or a HE AP 502.

In some embodiments, the HE STA 504 and/or HE AP 502 may be configured to operate in accordance with IEEE 802.11mc. In example embodiments, the radio architecture of FIG. 1 is configured to implement the HE STA 504 and/or the HE AP 502. In example embodiments, the front-end module circuitry of FIG. 2 is configured to implement the HE STA 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-20.

In example embodiments, the HE station 504 and/or the HE AP 502 are configured to perform the methods and operations/functions described herein in conjunction with FIGS. 1-20. In example embodiments, an apparatus of the EHT station 504 and/or an apparatus of the HE AP 502 are configured to perform the methods and functions described herein in conjunction with FIGS. 1-20. The term Wi-Fi may refer to one or more of the IEEE 802.11 communication standards. AP and STA may refer to EHT/HE access point 502 and/or EHT/HE station 504 as well as legacy devices 506.

In some embodiments, a HE AP STA may refer to a HE AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP.

Figure 6:
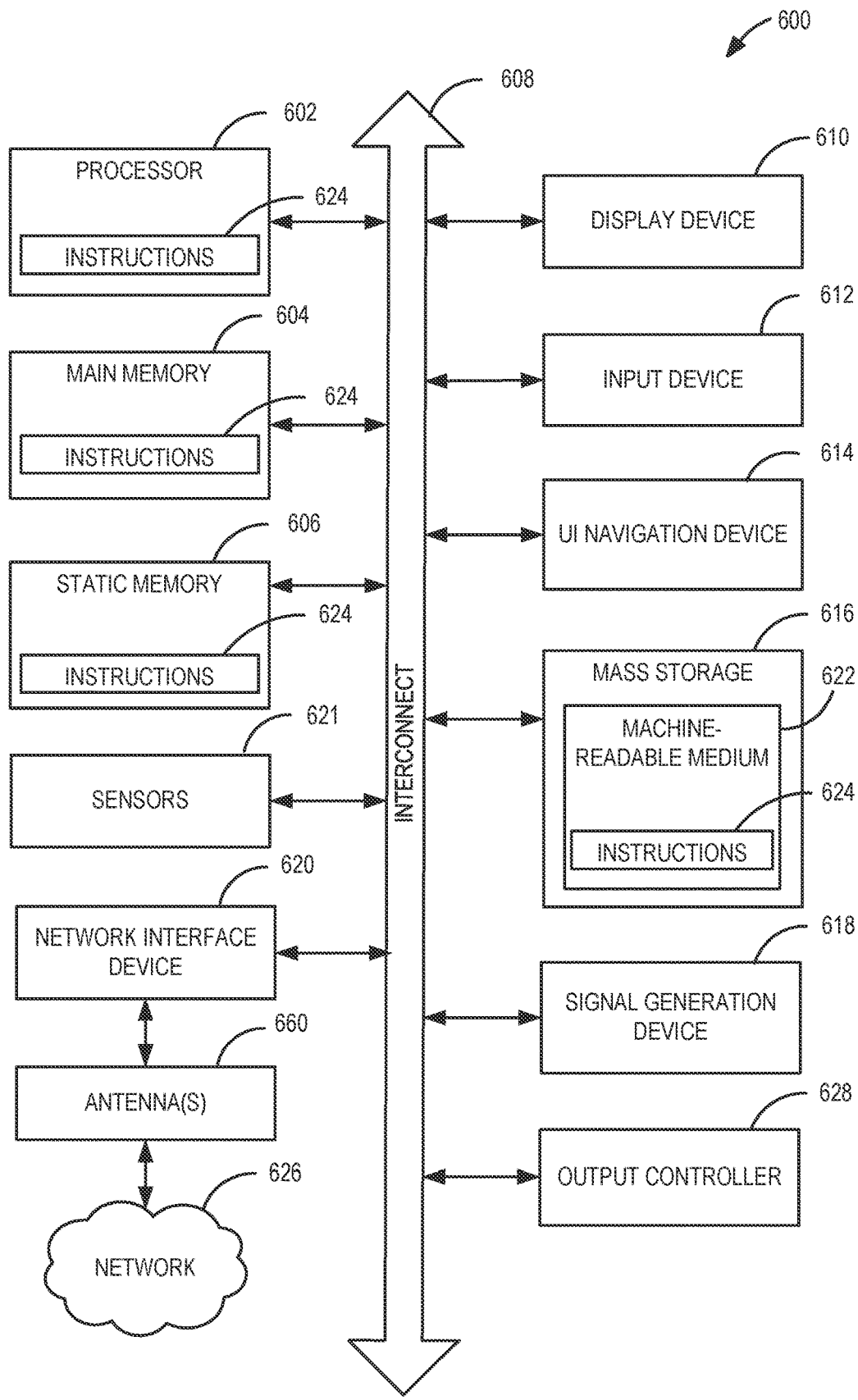
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
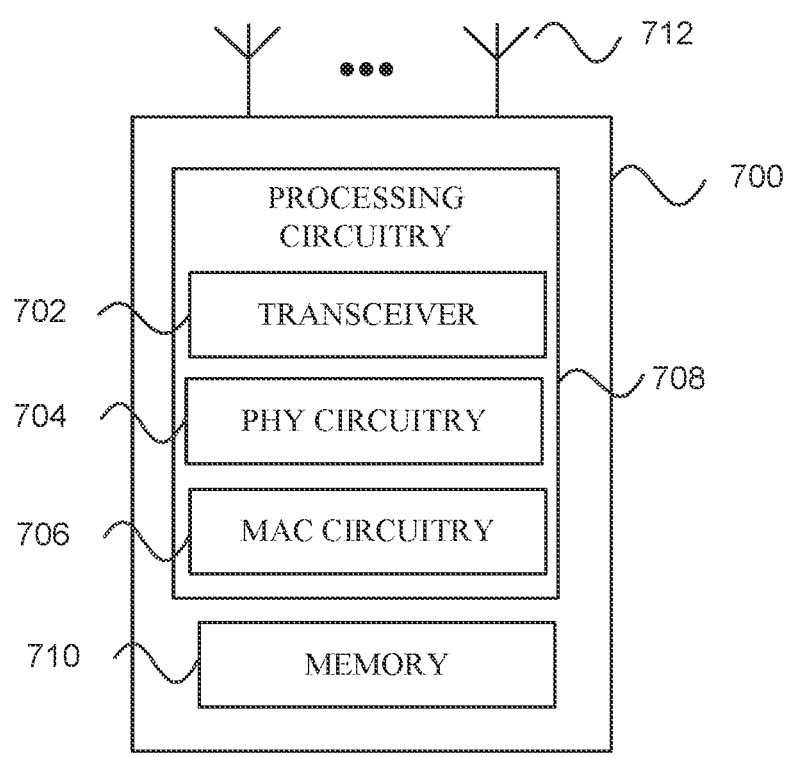
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
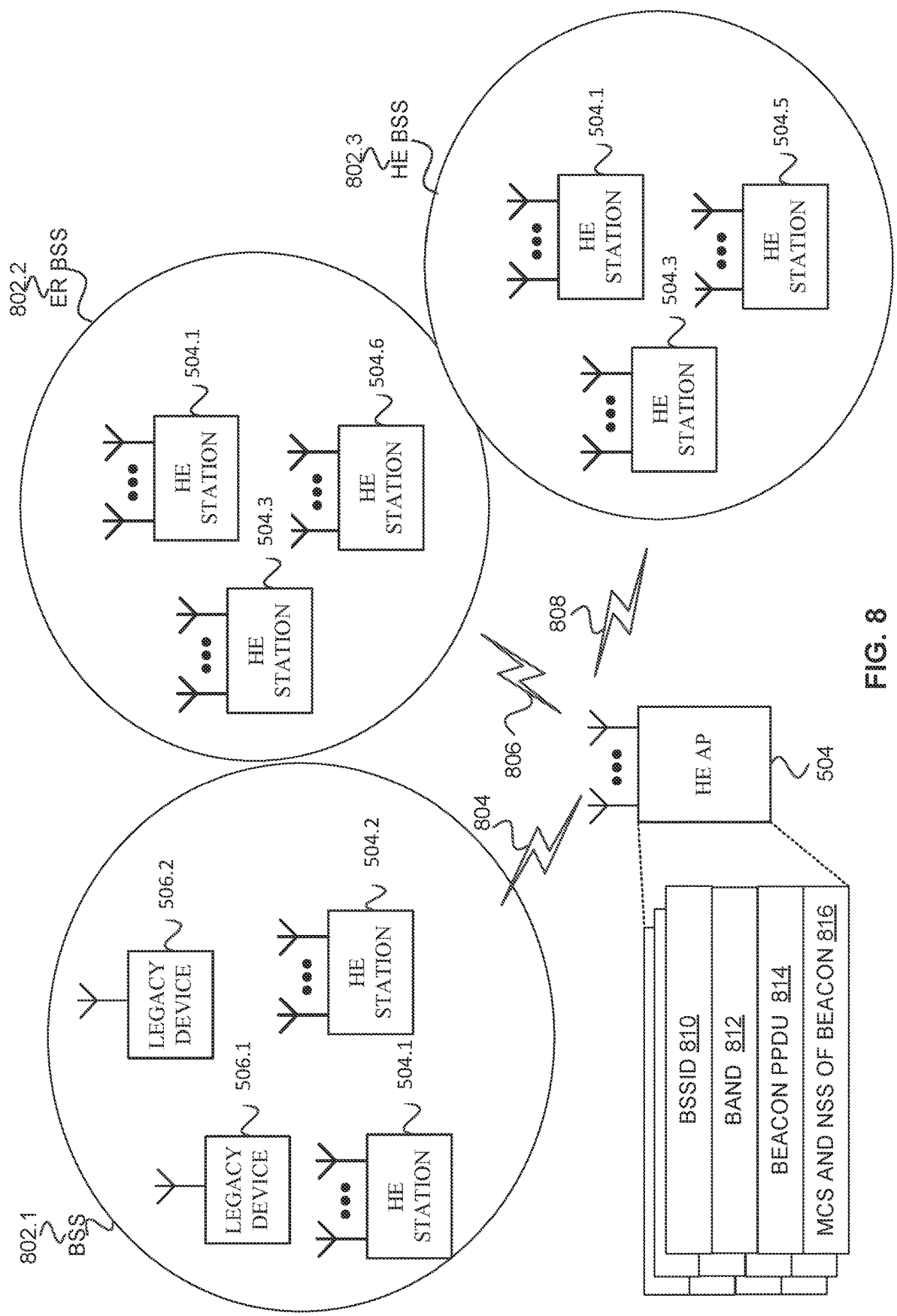
FIG. 8 illustrates a basic service set (BSS) 802.1, extended range (ER) BSS, HE BSS, and HE AP, in accordance with some embodiments.

FIG. 8 illustrates a basic service set (BSS) 802.1, extended range (ER) BSS 802.2, HE BSS 802.3, and HE AP 504, in accordance with some embodiments. HE AP 504 may start the BSS 802.1, the ER BSS 802.2, or the HE BSS 802.3. In some embodiments, another HE AP 504 (not illustrated) may start one of the BSSs 802. The HE AP 504 may include BSS identification (ID) 810, band 812, beacon PPDU 814, and MCS and NSS of beacon 816.

The BSSID 810 may be an ID for the BSS. In some embodiments, each BSS 802 has a different BSSID 810. The band 812 may be 2.4, 5.0, 6.0 GHz or another band. BSSs 802 may operate on one or more bands 812. For example, BSS 802.1 may operate on 2.4 and/or 5 GHz band. HE BSS 802.3 may operate on a 6 GHz band. ER BSS 802.2 may operate on a 2.4 and/or 5 GHz band (or 6 GHz.)

There may be different BSSIDs 810 for each BSS 802. There may be different bands 812 for each BSS 802. There may be different beacon PPDUs 814 for each BSS 802. There may be a different MCS and NSS of beacon 816 for each BSS 802.

Beacon frames 804, 806, 808 may include an operational element that may include basic HE-MCS and NSS set 1200. Mandatory HE-MCS and NSS set 1300 may be predefined, e.g., it may be part of a communication protocol such as IEEE 802.11ax. Additionally, the operational element may include a supported HE-MCS and NSS set field. A mandatory MCS and NSS set (not illustrated) may be predefined for legacy devices 506, e.g., it may be part of a communication protocol such as IEEE 802.11.

In the HE BSS 802.3 a HE STA that is starting an HE BSS 802.2 shall be able to receive and transmit at each of the value indicated by the basic HE-MCS and NSS set 1200, and shall be able to receive and transmit at each of the HE-MCS and NSS tuple values indicated by the supported HE-MCS and NSS set field (not illustrated). BSS 802.1 may be permit legacy devices 506 to associate with the BSS 802.1. ER BSS 802.2 may not permit legacy devices 506 to associate with ER BSS 802.2. ER BSS 802.2 may be for HE STAs 504. HE BSS 802.3 may be for HE STAs 504. HE BSS 802.3 may not permit legacy device 506 to associate with the HE BSS 802.3.

BSS 802.1 may be termed a non-HE BSS. In order to make sure that a BSS can be discovered by all the legacy STAs, e.g., legacy devices 506.1, the beacon 804 of the BSS 802.1 is transmitted with non-HT PPDU (not illustrated) and encoded with one of the mandatory rates, e.g., mandatory MCS and NSS set for non-HT PPDU.

The HE AP 504 uses a HE ER PPDU 1100 for the beacon 806 for the ER BSS 802.2. In some embodiments, rate selection is (or MCS NSS selection) is performed according to the following. If the BSSBasicRateSet parameter is not empty, a non-space time block coding (STBC) power save multi-poll (PSMP) frame or a non-STBC Beacon frame that is not an ER beacon (e.g., 806) shall be transmitted in a non-HT PPDU (e.g., beacon 804 is transmitted in a non-HT PPDU) using one of the rates included in the BSSBasicRateSet parameter (e.g., basic HE-MCS and NSS set 1200). If the BSSBasicRateSet parameter is empty, the frame shall be transmitted in a non-HT PPDU using one of the mandatory PHY rates (e.g., mandatory MCS and NSS set for non-HT PPDU). The BSSBasicRateSet parameter may be the same or similar as basic HE-MCS and NSS set 1200. Mandatory PHY rates may be the same or similar as mandatory MCS and NSS set for non-HT PPDU, in accordance with some embodiments.

In some embodiments, ER BSS 802.2 may use ER beacons (e.g., beacon 806) for ER BSS 802.2. In some embodiments, an ER Beacon frame is a beacon frame carried in HE ER SU PPDU (242-tone RU or high frequency 106-tone RU in P20) format to provide additional link budget of downlink transmission to compensate the link budget imbalance between downlink and uplink due to introduction of UL OFDMA transmission. An HE AP 504 may operate an ER BSS 802.2 in addition to a non-HT BSS (e.g., BSS 802.1). An ER BSS 802.2, when present, shall operate independent of the non-HT BSS and shall have a BSSID different from the non-HT BSS operated by the AP. An ER BSS may have larger coverage area, e.g., the coverage area that is represented by the circle in FIG. 8 may be larger for the ER BSS 802.2, which may be partly due to the lower MCS and NSS tuple used.

The HE AP 504 may want to limit the coverage of a BSS 802 to enable small cell deployment. A more limited coverage than the ER BSS 802.2 may be useful when the band is 6 GHz where a larger bandwidth is available for transmissions and discovery can be done on a 2.4 or 5 GHz band.

A data rate (which is based on the MCS and NSS of beacon 816) of HE ER PPDU 1100 can be MCS 0 (4.3 Mb/s), 1 (8.6 Mb/s), 2 (25.8 Mb/s) for 242 tone resource unit (RU) transmission or MCS 0 (3.8 Mb/s) for 106 tone RU transmission. A value of the MCS may indicate a selection in a table where the table is for a number of spatial streams used and a size of a RU, e.g., here 242 tone RU. MCS may refer to HE-MCS index value, in accordance with some embodiments.

A row for a HE-MCS index value (e.g., 0, 1, 2, . . . ) may include choices for dual carrier modulation (DCM) being equal to 1 or 0; a type of modulation (e.g., BPSK, QPSK, 16-QAM, 64-QAM, 256-QAM, 1024-QAM; a code rate (r) (e.g., 1/2, 3/4, 2/3, 5/6, etc.); Number of coded bits per subcarrier per spatial stream ($N_{BPSCS}$), e.g., 1, 2, 4, 6, 8, 10, . . . ; number of data subcarriers per frequency segment $N_{SD}$, e.g., 117, 234, etc.; Number of coded bits per symbol ($N_{CBPS}$), e.g., 117, 234, 468, 936, 1404, 1872, 2340, etc.; number of data bits per symbol ($N_{DBPS}$) 58, 117, 234, 351, 468, 351, 702, 936, 1053, 1170, 1404, 1560, 1755, 1950, etc.; and, Guard interval (GI), e.g., 0.8 µs, 1.6 µs, 3.2 µs, etc.

The different values across the row for the selection of the HE-MCS determine the data rate.

A beacon frame (e.g., 804, 806, 808, 928, 1028, 1128) may become large (e.g., 3895 bytes) in a HE BSS 802.3 or ER BSS 802.2. The data rates available for HE ER PPDU 1100 that carries a beacon frame (e.g., 804, 806, 808, 928, 1028, 1128) may mean the transmission time of the HE ER PPDU 1110 with the beacon frame (e.g., 804, 806, 808, 928, 1028, 1128) may be longer than it would be with higher data rates. Further, the maximum duration that can be indicated by L-SIG (e.g., 906, 1106, 1206) is around 5.3 ms, which means that MCS0 for 242 tone RU transmission or MCS0 for 106 tone RU transmission cannot be used to transmit a beacon frame with 3895 bytes (e.g., MCS0 242 tone RU with one spatial stream is 4.3 Mb/s, which would be about 9.1 ms to transmit it and the L-SIG can only be 5.3 ms). If a multiple BSSID element is included in the beacon frame (e.g., 804, 806, 808, 928, 1028, 1128), which combines information of all the non-transmitted BSSID profile into one beacon frame (e.g., 804, 806, 808, 928, 1028, 1128), it is highly possible to reach the 3895 size limit.

In some embodiments, the beacon frame (e.g., 804, 806, 808, 928, 1028, 1128) is sent using a HE PPDU, e.g., HE SU PPDU 1000 or HE MU PPDU 900, where the data rate can be chosen from the basic HE-MCS and NSS set 1200 or the mandatory HE-MCS and NSS set 1300, e.g., tuples <HE-MCS, NSS> with mandatory support for all the STAs. The notation <HE-MCS, NSS> indicates a selection of a HE-MCS and NSS, which refers to a row in a communication standard, e.g., IEEE 802.11ax, that indicate values of other parameters of the transmission, e.g., coding rate (r).

A HE BSS 802.3 that transmits a beacon frame (e.g., 804, 806, 808, 928, 1028, 1128) with a HE SU PPDU 1000 or HE MU PPDU 900 may provide a technical effect that the HE AP 504 can control the coverage by using the different types of PPDUs and data rates. The overhead of a beacon frame (e.g., 804, 806, 808, 928, 1028, 1128) can also be reduced, which is a desirable situation when multiple beacon information is combined for multiple BSSIDs into one beacon frame (e.g., 804, 806, 808, 928, 1028, 1128).

In some embodiments, if the basic HE-MCS and NSS set 1200 of the HE AP 502 that starts a BSS (802.1, 802.2, 802.3) is not empty, the HE AP 502 transmits beacon frames (e.g., 804, 806, 808, 928, 1028, 1128) and group-addressed frames in HE ER SU PPDU 1100 or HE SU PPDU 1000 (or HE MU PPDU 900) using one of the <HE-MCS, NSS> tuples included in the basic HE-MCS and NSS set 1200. If the basic HE-MCS and NSS set 1200 of the HE AP 504 that starts an BSS 802 is empty, then the HE AP 502 shall transmit the beacon frame (e.g., 804, 806, 808, 928, 1028, 1128) and group addressed frames in HE_ER_SU PPDU 1100 or HE SU PPDU 1000 (or HE MU PPDU 900) using one a tuple <HE-MCS, NSS> of the mandatory HE-MCS and NSS set 1300.

Figure 9:
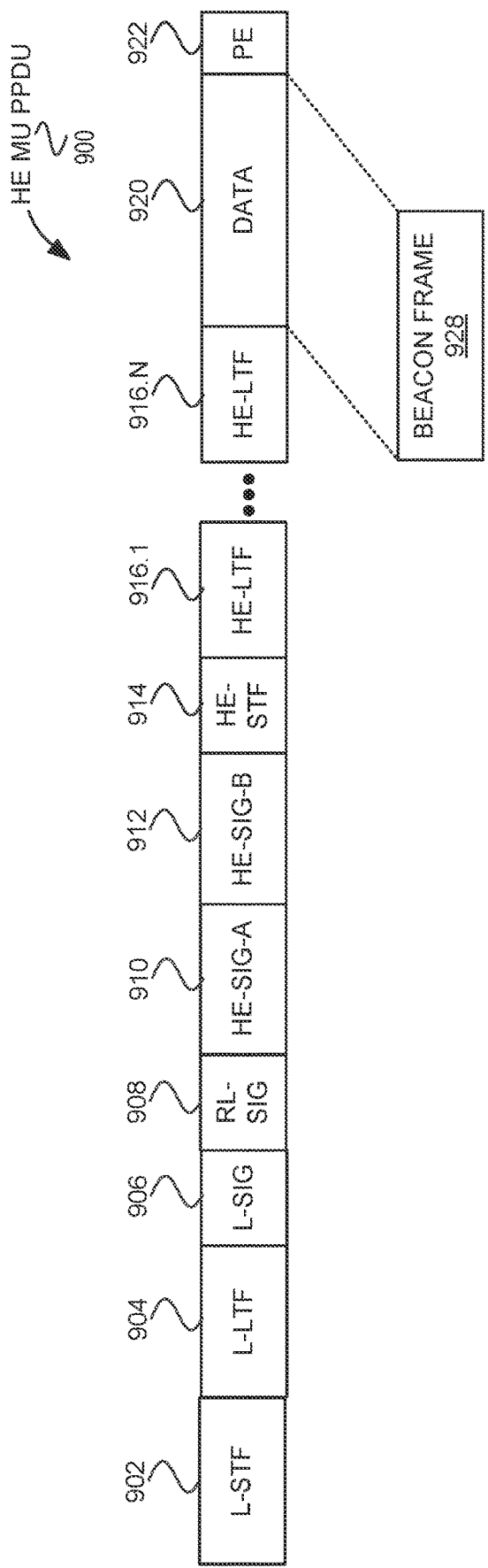
FIG. 9 illustrates a HE multi-user (MU) physical Layer Convergence Procedure (PLCP) Protocol Data Unit (PPDU), in accordance with some embodiments.

FIG. 9 illustrates a HE multi-user (MU) physical Layer Convergence Procedure (PLCP) Protocol Data Unit (PPDU) 900, in accordance with some embodiments. The HE MU PPDU 900 comprises legacy (L) short training field (STF) 902, L-long training field (LTF) 904, L-signal (SIG) field 906, a repeat (R) L-SIG field 908, a HE-SIG-A field 910, a HE-SIG-B field 912, a HE-STF 914, HE-LTF fields 916.1 through HE-LTF fields 916.N, data 920, and packet extension (PE) field 922.

L-STF 902 may be a training field for improving automatic gain control estimation or other training based on channel estimation from received signals. The L-LTF 904 may be a training field for improving automatic gain control estimation or other training based on channel estimation from received signals. The L-SIG field 906 may comprise information for decoding portions of the HE MU PPDU 900. The RL-SIG field 908 may be a repeat of the L-SIG 906 and may indicate that the packet is an HE packet. The HE-SIG-A field 910 may include information for decoding the portion of the HE MU PPDU 900 after the HE-SIG-A field 910 with information such as the MCS. In some embodiments, the pre-HE modulated fields of the HE MU PPDU 900 are L-STF 902 through HE-SIG-B 912 with the fields HE-STF 914 through data 920 (and in some embodiments PE 922) being modulated in accordance with the MCS and NSS specified in the HE-SIG-A 910. The HE-SIG-B field 912 may include information for the HE stations 504 to decode a portion of the HE-SIG-B field 912, which may be modulated differently than the pre-HE modulated fields and the HE modulated fields.

HE-STF 914 may be a training field for improving automatic gain control estimation or other training based on channel estimation from received signals. HE-LTF fields 916.1 through HE-LTF fields 916.N may be fields for improving automatic gain control estimation or other training based on channel estimation from received signals. The data field 920 may include one or more MAC frames including the beacon frame 928. The data field 920 may include one or more media access control (MAC) protocol data units (MPDUs) that may be included in an aggregated-MPDU (A-MPDU) or a single MPDU (S-MPDU). A MPDU may include one or more MAC service data units (MSDUs). PE field 922 may be a field that may be used to extend the size of the packet to meet one or more boundaries. The duration of the fields may be L-STF 902 (8 μs), L-LTF 904 (8 μs), L-SIG field 906 (4 μs), RL-SIG field 908 (4 μs), HE-SIG-A 910 (8 μs), HE-SIG-B 912 (4 μs per symbol), HE-STF 914 (4 μs), HE-LTF fields 916.1 through HE-LTF fields (variable per HE-LTF symbol), 916.N PE field 922 (variable).

Figure 10:
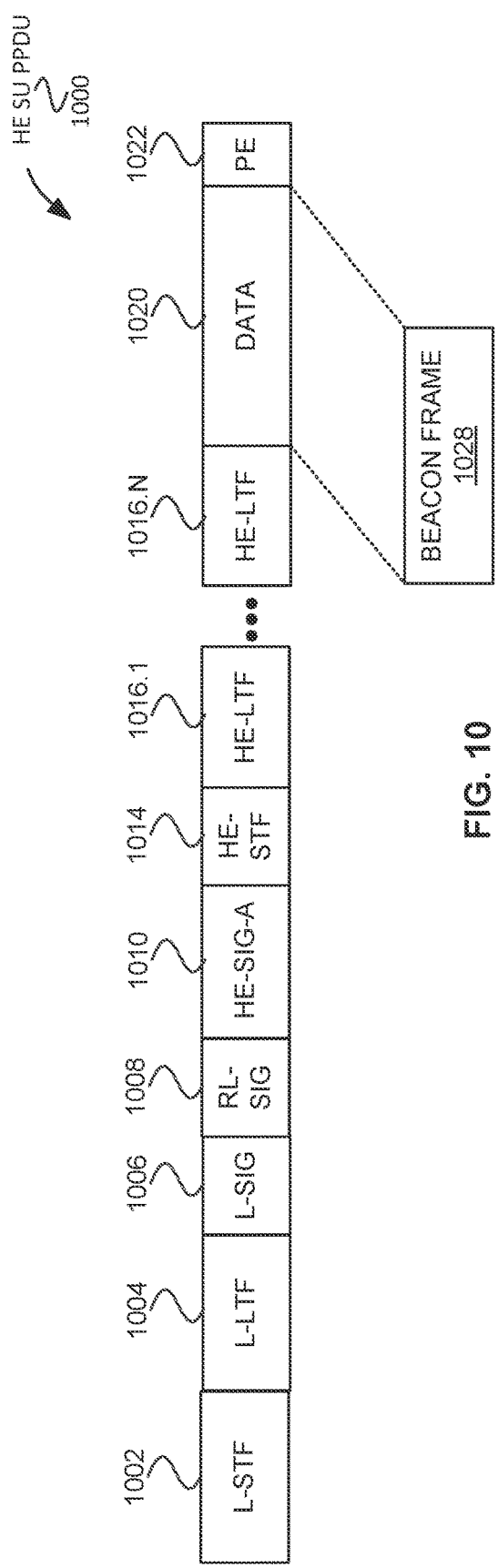
FIG. 10 illustrates a HE single-user (SU) PPDU, in accordance with some embodiments.

FIG. 10 illustrates a HE single-user (SU) PPDU 1000, in accordance with some embodiments. The HE SU PPDU 1000 comprises L-STF 1002, L-LTF 1004, L-SIG field 1006, a RL-SIG field 1008, a HE-SIG-A field 1010, a HE-STF 1014, HE-LTF fields 1016.1 through HE-LTF fields 1016.N, data 1020, and PE field 1022. The L-STF 1002, L-LTF 1004, L-SIG field 1006, a RL-SIG field 1008, a HE-SIG-A field 1010, a HE-STF 1014, HE-LTF fields 1016.1 through HE-LTF fields 1016.N, data 1020, and PE field 1022 may be the same or similar as the corresponding field in the HE MU PPDU 900 with the same durations. The data field 1020 may include one or more MPDUs that may be included in an A-MPDU or a S-MPDU. A MPDU may include one or more MSDUs. The data 1020 may include the beacon frame 1028.

Figure 11:
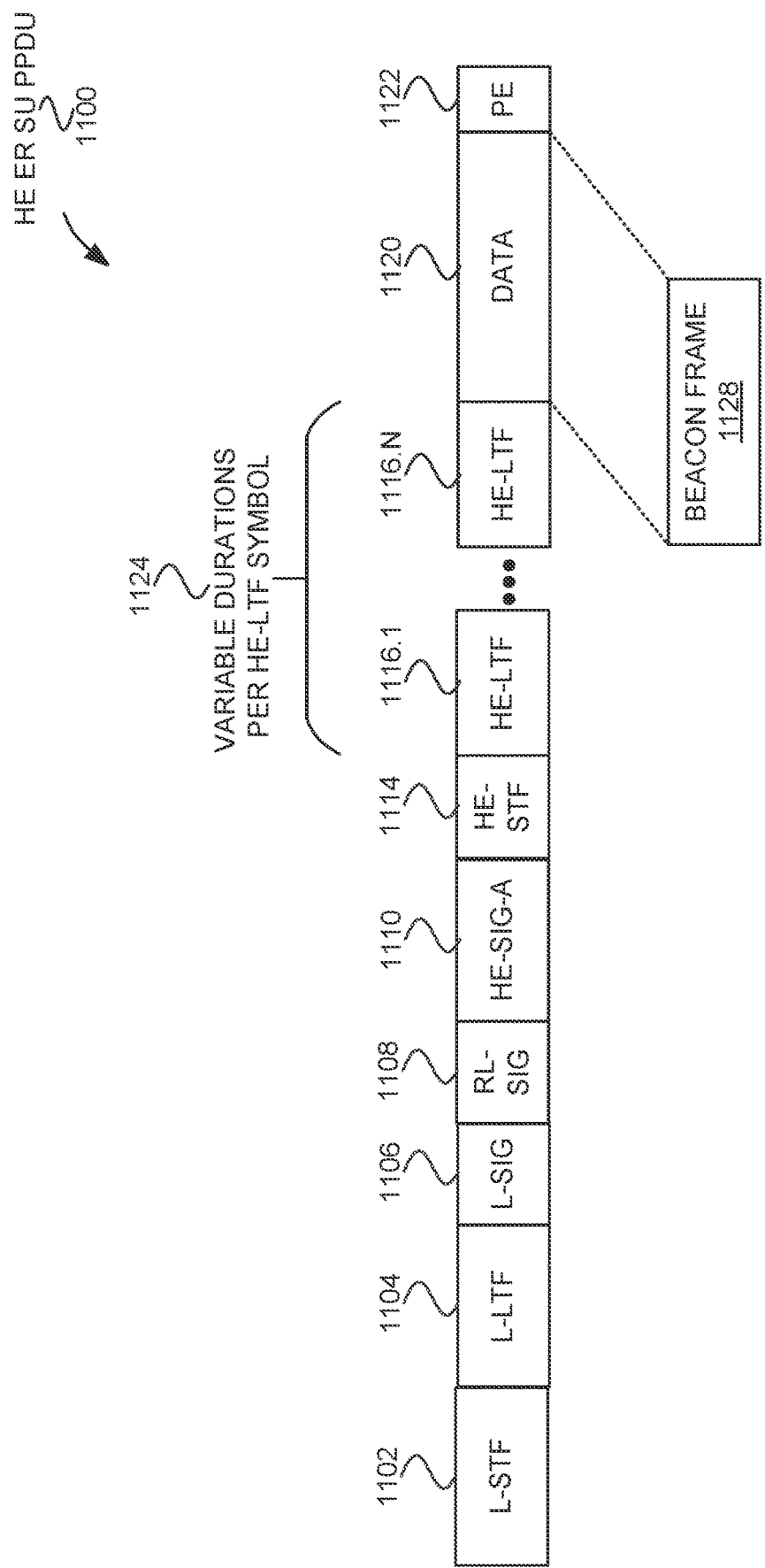
FIG. 11 illustrates a HE extended range (ER) SU PPDU, in accordance with some embodiments.

FIG. 11 illustrates a HE extended range (ER) SU PPDU 1100, in accordance with some embodiments. The HE ER SU PPDU 1100 comprises L-STF 1102, L-LTF 1104, L-SIG field 1106, a RL-SIG field 1108, a HE-SIG-A field 1110, a HE-STF 1114, HE-LTF fields 1116.1 through HE-LTF fields 1116.N, data 1120, and PE field 1122.

L-STF 1102, L-LTF 1104, L-SIG field 1106, a RL-SIG field 1108, a HE-SIG-A field 1110, a HE-STF 1114, HE-LTF fields 1116.1 through HE-LTF fields 1116.N, data 1120, and PE field 1122 may be the same or similar as the corresponding fields of the HE SU PPDU 1000. The durations of the fields may be the same or similar as the HE SU PPDU 1000 except the HE-SIG-A field 1110 may be 16 μs. The data field 1120 may include one or more MPDUs that may be included in an A-MPDU or a S-MPDU. A MPDU may include one or more MSDUs. The data 1120 may include the beacon frame 1128. In some embodiments, the beacon frame 1128 is comprised in a S-MPDU.

Figure 12:
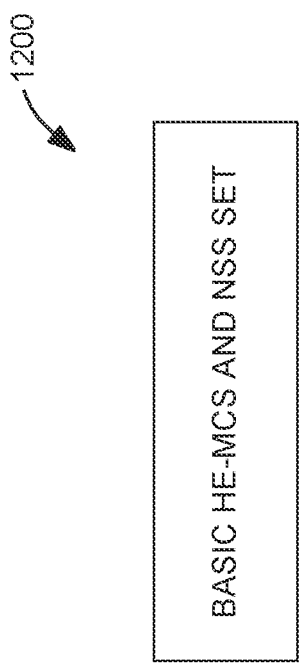
FIG. 12 illustrates a basic HE modulation and coding scheme (MCS) and number of spatial streams (NSS) set, in accordance with some embodiments.

FIG. 12 illustrates a basic HE modulation and coding scheme (MCS) and number of spatial streams (NSS) set 1200, in accordance with some embodiments. The basic HE-MCS and NSS set 1200 may be a field that indicates a maximum HE-MCS for a number of spatial streams (SS).

Figure 13:
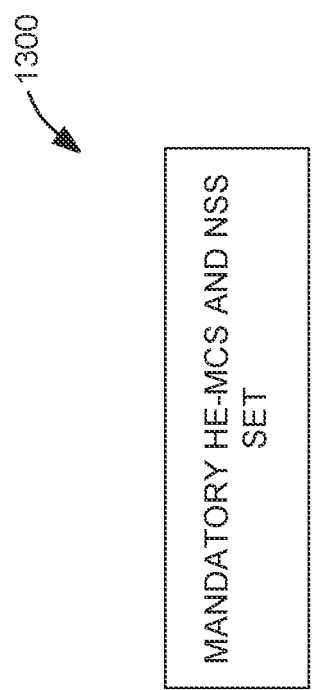
FIG. 13 illustrates a mandatory HE-MCS and NSS set, in accordance with some embodiments.

FIG. 13 illustrates a mandatory HE-MCS and NSS set 1300, in accordance with some embodiments. Mandatory HE-MCS and NSS set 1300 may be a field that indicates a maximum HE-MCS for a number of SSs. In some embodiments, mandatory HE-MCS and NSS set 1300 is predetermined and a HE STA 502 does not join a BSS (e.g., HE BSS 802.3 or ER BSS 802.2) unless the HE STA 502 can receive transmissions in accordance with the mandatory HE-MCS and NSS set 1300. In some embodiments, the mandatory HE-MCS and NSS set 1300 may be termed a mandatory PHY rates.

Figure 14:
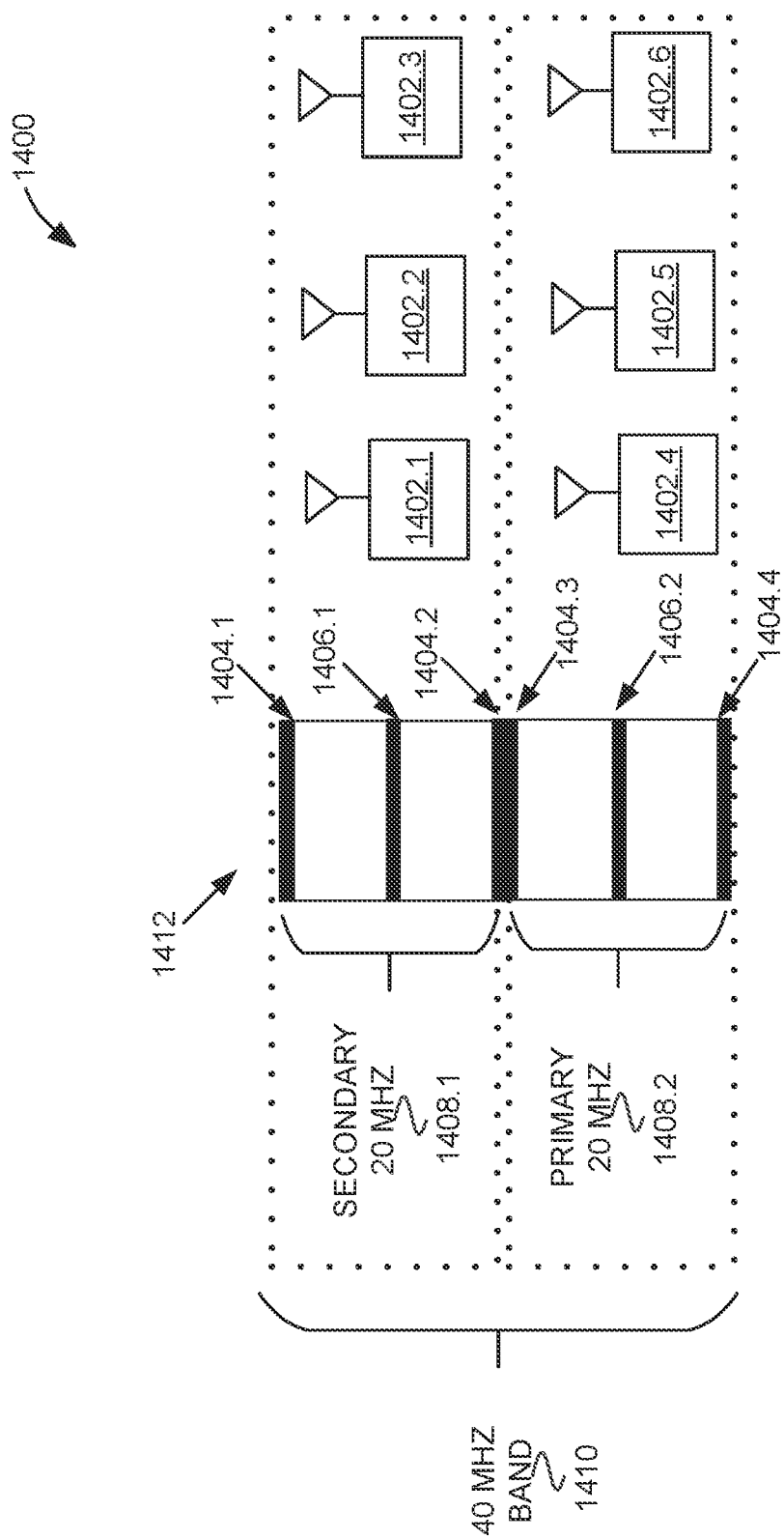
FIG. 14 illustrates a NDP format, in accordance with some embodiments.

FIG. 14 illustrates a NDP format 1400, in accordance with some embodiments. Illustrated in FIG. 14 is a 40 MHz band 1410, secondary 20 MHz 1408.1, primary 20 MHz 1408.2, edge tones 1404, DC tones 1406, NDP 1412, and 20 MHz only STAs 1402. The 40 MHz band 1410 is a band used to communicate in a BSS. The 40 MHz band 1410 may be divided into a second 20 MHz 1408.1 channel and a primary 20 MHz 1408.2 channel. The NDP 1412 may be a NDP 1412 with a bandwidth of 40 MHz that is transmitted by a HE AP 502 or HE STA 504. Edge tones 1404 are tones that are at the edge of the 20 MHz channels (e.g., 1408.1, 1408.2). The DC tones 1406 are in the center of the 20 MHz channels (e.g., 1408.1, 1408.2). The 20 MHz only STAs 1402 may be HE STAs 504 that operate only on 20 MHz. In some embodiments, the 20 MHz only STAs 1402 may operate on a different bandwidth, but are operating on 20 MHz for receiving the NDP 1412. The NDP 1412 may be transmitted in accordance with OFDMA and/or MUMIMO.

In some embodiments, secondary 20 MHz 1408.1 and/or primary 20 MHz 1408.2 may be a target wake time (TWT) channel for the 20 MHz only STAs 1402.

In some embodiments, a TWT channel is negotiated between the HE AP 502 and a 20 MHz-only non-AP STA (e.g., 1402) on a secondary channel (e.g., 1408.1). In some embodiments, a channel to use for NDP channel sounding is defined for primary 20 MHz, 40 MHz and 80 MHz channel band. In some embodiments, the HE AP 502 and a 20 MHz-only non-AP STA (e.g., 1402) may perform beamforming on a secondary channel band (e.g., 1408.1). In some embodiments, there is little or no energy transmitted on the DC tones 1406 and the edge tones 1404. In some embodiments, the edge tones 1404 and DC tones 1406 enables the HE AP 502 and 20 MHz only STAs 1402 to perform beamforming or channel feedback on the secondary 20 MHz 1408.1 channel and the primary 20 MHz 1408.2 channel with the HE AP 502 transmitting a 40 MHz NDP 1412. The beamforming or channel feedback may be performed with 20 MHz only STAs 1402 on different 20 MHz channels (e.g., 1408.1, 1408.2) with a single transmission of the NDP 1412. In some embodiments, transmitting little or no energy on the DC tones 1406 and edge tones 1404 enables proper or better performance for beamforming or channel feedback between the HE AP 502 and the 20 MHz only STAs 1402.

Figure 15:
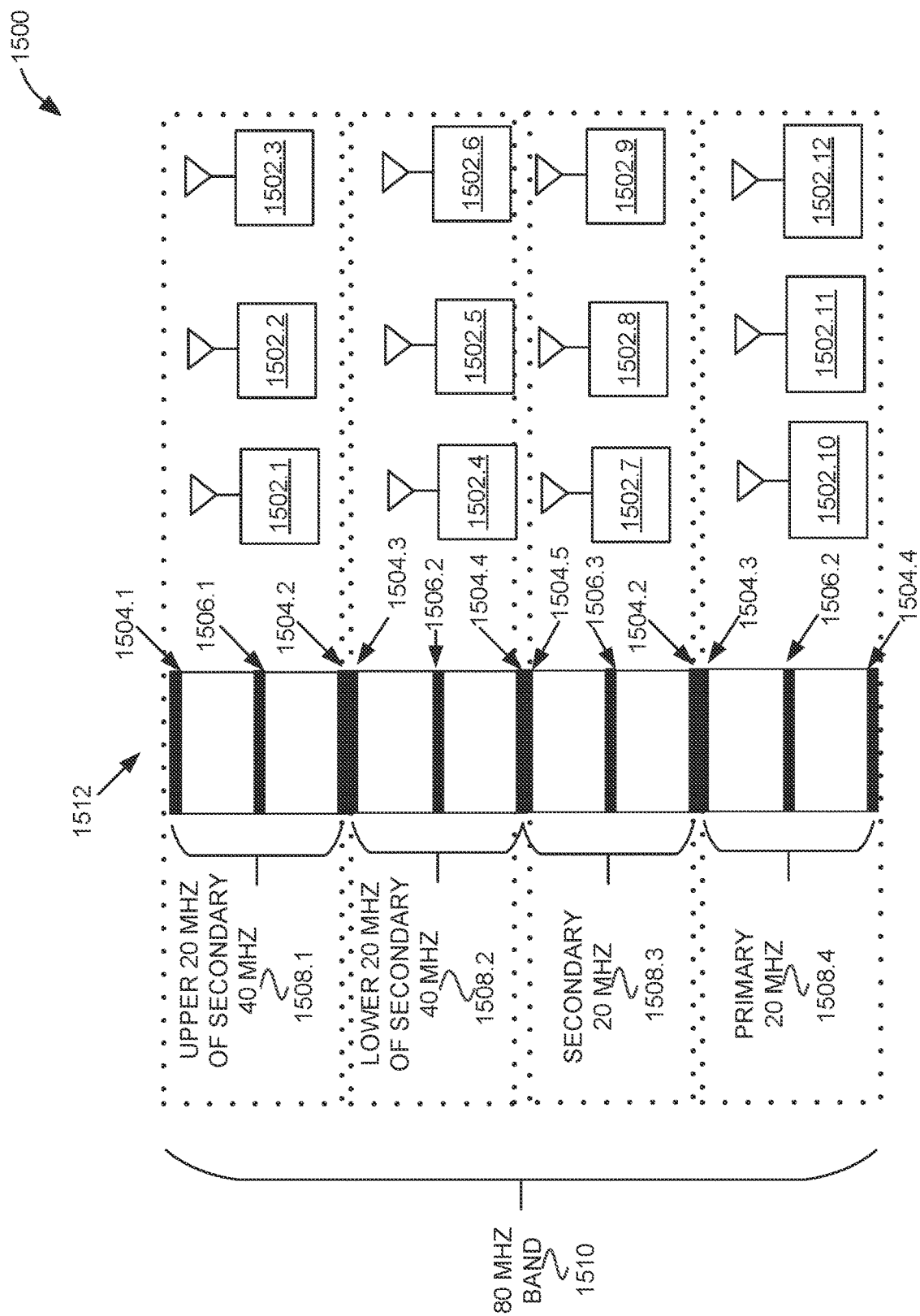
FIG. 15 illustrates a NDP format, in accordance with some embodiments.

FIG. 15 illustrates a NDP format 1500, in accordance with some embodiments. Illustrated in FIG. 15 is a 80 MHz band 1510, upper 20 MHz of secondary 40 MHz 1508.1, lower 20 MHz of secondary 40 MHz 1508.2, secondary 20 MHz 1508.3, primary 20 MHz 1508.4, edge tones 1504, DC tones 1506, NDP 1512, and 20 MHz only STAs 1502. The 80 MHz band 1510 is a band used to communicate in a BSS. The 80 MHz band 1510 may be divided into upper 20 MHz of secondary 40 MHz 1508.1, lower 20 MHz of secondary 40 MHz 1508.2, secondary 20 MHz 1508.3, and primary 20 MHz 1508.4 channels.

The NDP 1512 may be a NDP 1512 with a bandwidth of 80 MHz that is transmitted by a HE AP 502 or HE STA 504. Edge tones 1504 are tones that are at the edge of the 20 MHz channels (e.g., 1508.1, 1508.2, 1508.3, 1508.4). The DC tones 1506 are in the center of the 20 MHz channels (e.g., 1508.1, 1508.2, 1508.3, 1508.4). The 20 MHz only STAs 1502 may be the same or similar as 20 MHz only STAs 1402. The NDP 1412 may be transmitted in accordance with OFDMA and/or MUMIMO.

In some embodiments, upper 20 MHz of secondary 40 MHz 1508.1, lower 20 MHz of secondary 40 MHz 1508.2, secondary 20 MHz 1508.3, primary 20 MHz 1508.4 may be a TWT channel for the 20 MHz only STAs 1402.

In some embodiments, a TWT channel is negotiated between the HE AP 502 and a 20 MHz-only non-AP STA (e.g., 1502) on secondary channels and the primary channel (e.g., 1508). In some embodiments, a channel to use for NDP channel sounding is defined for primary 20 MHz, 40 MHz and 80 MHz channel band. In some embodiments, the HE AP 502 and a 20 MHz-only non-AP STA (e.g., 1502) may perform beamforming on secondary channels (e.g., 1508). In some embodiments, there is little or no energy transmitted on the DC tones 1506 and the edge tones 1504. The beamforming or channel feedback may be performed with 20 MHz only STAs 1402 on different 20 MHz channels (e.g., 1508.1 through 1508.4) with a single transmission of the NDP 1512. In some embodiments, transmitting little or no energy on the DC tones 1506 and edge tones 1504 enables proper or better performance for beamforming or channel feedback between the HE AP 502 and the 20 MHz only STAs 1502.

In some embodiments, the 80 MHz band 1510 may be larger, e.g., 160, 80+80, 160+160, 320, 640, etc., with the larger band split up into 20 MHz channels with similar or the same pattern of edge tones 1504 and DC tones 1506.

The HE AP 502 (beamformer) uses the existing 40 MHz (1412) or 80 MHz NDP (1512) for the channel sounding with the 20 MHz-only non-AP STA (beamformee) 1402, 1502. The 20 MHz-only STA uses the LTF sequence (of the NDP 1412, 1512) for the 40 MHz or 80 MHz NDP (1412, 1512) for the frequency domain channel estimation.

The HE AP 502 needs to put zero power on the tones of the 40 MHz or 80 MHz NDP 1412, 1512 which correspond to the DC tones 1406, 1506 or edge tones 1404, 1504 for each 20 MHz band (1408, 1508). 20 MHz only STAs 1402, 1502 may camp on a 20 MHz channel. A number of the tones for the edge tones 1404, 1504 (or edge resource unit, RU) and DC tones 1406, 1506 (or DC RU) may be a predetermined number, e.g., 1 through 30. After obtaining the channel estimation on each tone with non-zero sounding signal, the 20 MHz-only STA 1402, 1502 can prepare the channel state information (CSI) feedback for the tones of the 20 MHz channel the 20 MHz only STA 1402, 1502 is camped on.

Figure 16:
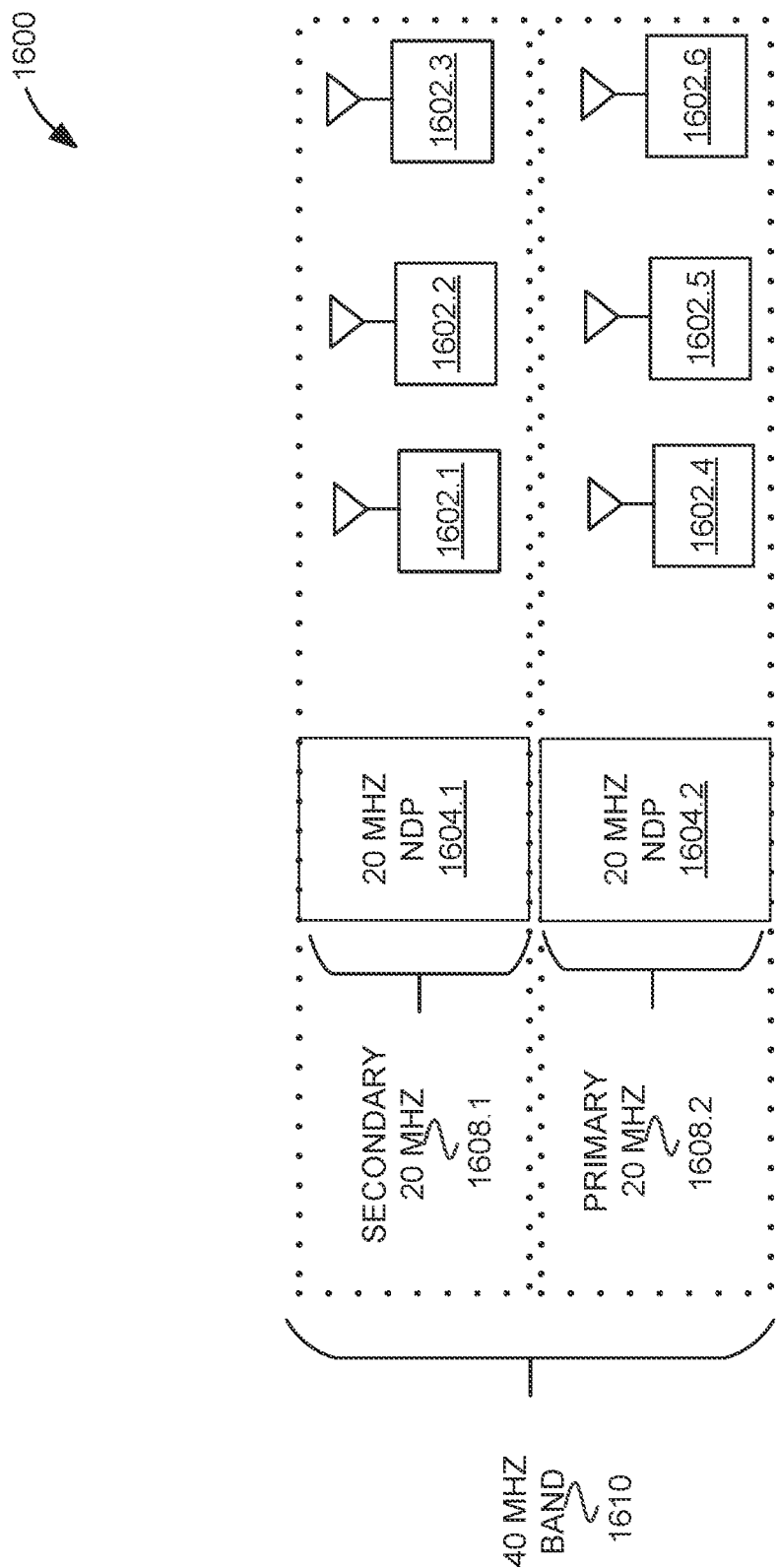
FIG. 16 illustrates a NDP format, in accordance with some embodiments.
Figure 17:
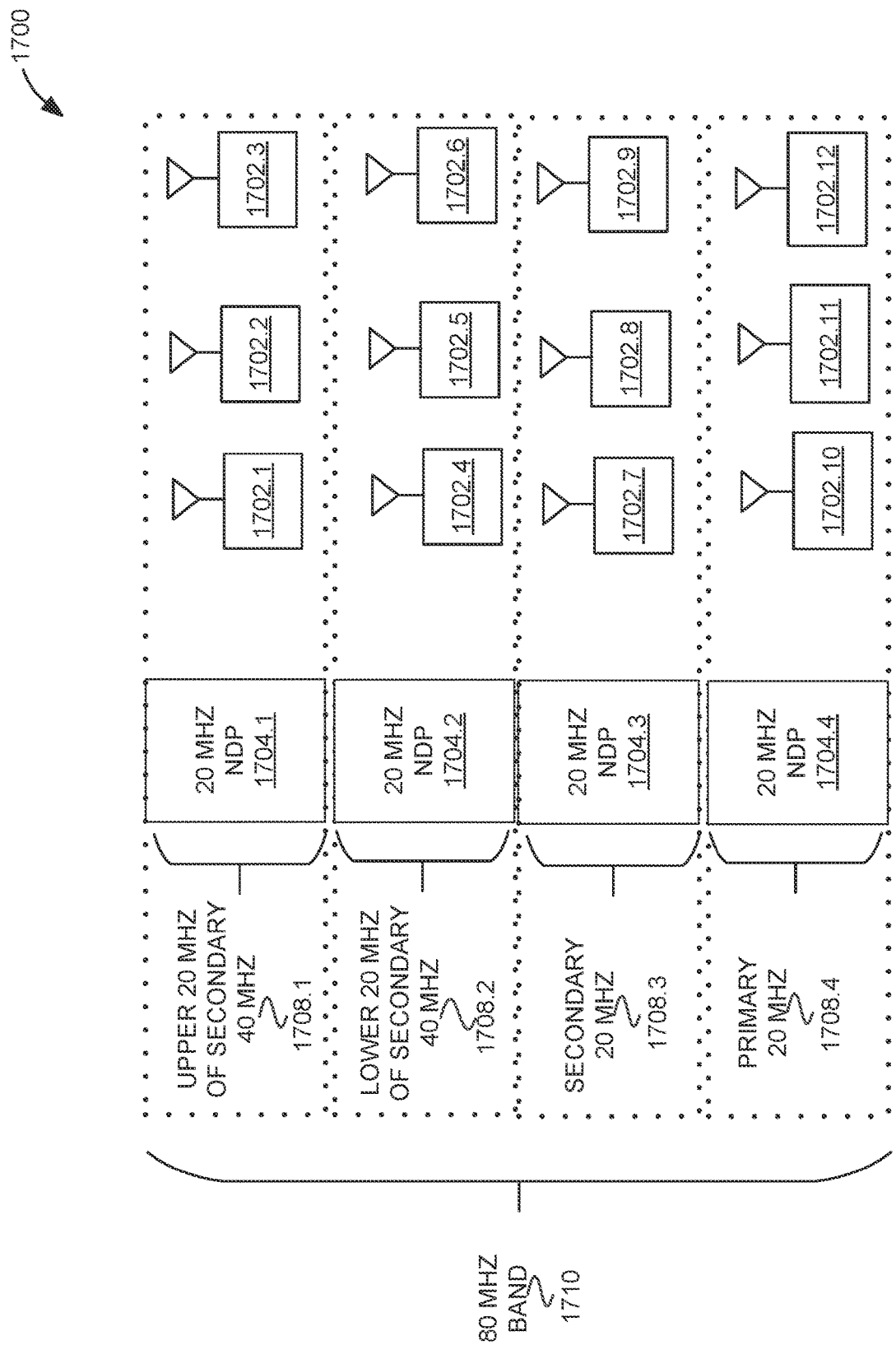
FIG. 17 illustrates a NDP format, in accordance with some embodiments.

FIG. 16 illustrates a NDP format 1600, in accordance with some embodiments. FIG. 17 illustrates a NDP format 1700, in accordance with some embodiments. Illustrated in FIG. 16 is 40 MHz band 1610, secondary 20 MHz 1608.1, primary 20 MHz 1608.2, 20 MHz NDP 1604.1, 20 MHz NDP 1604.2, and 20 MHz only STAs 1602. Illustrated in FIG. 17 is 80 MHz band 1710, upper 20 MHz of secondary 40 MHz 1708.1, lower 20 MHz of secondary 40 MHz 1708.2, secondary 20 MHz 1708.3, primary 20 MHz 1708.4, 20 MHz NDP 1704.1, 1704.2, 1704.3, 1704.4, and 20 MHz only STAs 1702.

A HE AP 502 or HE STA 504 may transmit NDPs (e.g., 20 MHz NDP 1604, 1704) on each 20 MHz band (e.g., 1608, 1708) to 20 MHz only STAs 1602, 1702. The 20 MHz only STAs 1602, 1702 may be the same or similar as 20 MHz only STAs 1402, 1502.

NDP frames 1604, 1704 may be transmitted on each of the 20 MHz channels (e.g., 1608, 1708). The NDP frames 1604, 1704 may be the same or similar as legacy NDP frames, e.g., IEEE 802.11ac/ax. For example, DC tones and edge tones may be in a same place and have a same number a NDP frame used for the primary 20 MHz band. In some embodiments, the placement of the edge tones and DC tones may be different. In some embodiments, the number of tones of the edge tones and DC tones may be from 1 to 30. In some embodiments, the number of tones and placement of the edge tones and the DC tones may vary in accordance with the placement of the 20 MHz channel (1708). The NDP frame 1604, 1704 may be transmitted on every secondary 20 MHz band 1604, 1704, and the 20 MHz-only STAs 1602, 1702 may be able to receive the 20 MHz NDP 1604, 1704 on the 20 MHz channel the 20 MHz only STA 1602, 1702 is camped, e.g., a primary or second channel. The 20 MHz only STA 1602, 1702 may estimate the frequency domain channel response and prepare the beamforming feedback for a corresponding 20 MHz band. An example for 40 MHz band 1610 is shown in FIG. 16 where the AP transmits two 20 MHz NDP (1604) on the primary 20 MHz channel (1604.2) and secondary 20 MHz channel (1604.1). FIG. 17 illustrates an example for 80 MHz band 1710, where an HE AP 502 transmit four 20 MHz NDP (1704) on every 20 MHz band (1708). On each 20 MHz band 1708, there could be one or more 20 MHz-only STA 1702 that listen to the 20 MHz NDP 1704. FIGS. 16 and 17 can be extended to bandwidths of 80+80, 160, 160+160, 320, 320+320, 640, etc. In some embodiments, in FIG. 14-17 one or more of the 20 MHz may be punctured, i.e., not occupied by the NDP.

The proposed method disclosed in FIG. 14-17 may allow the 20 MHz-only non-AP STA to maximally utilize the band and improve the efficiency of the network by allowing multiple 20 MHz bands to be used for NDP use simultaneously.

Figure 18:
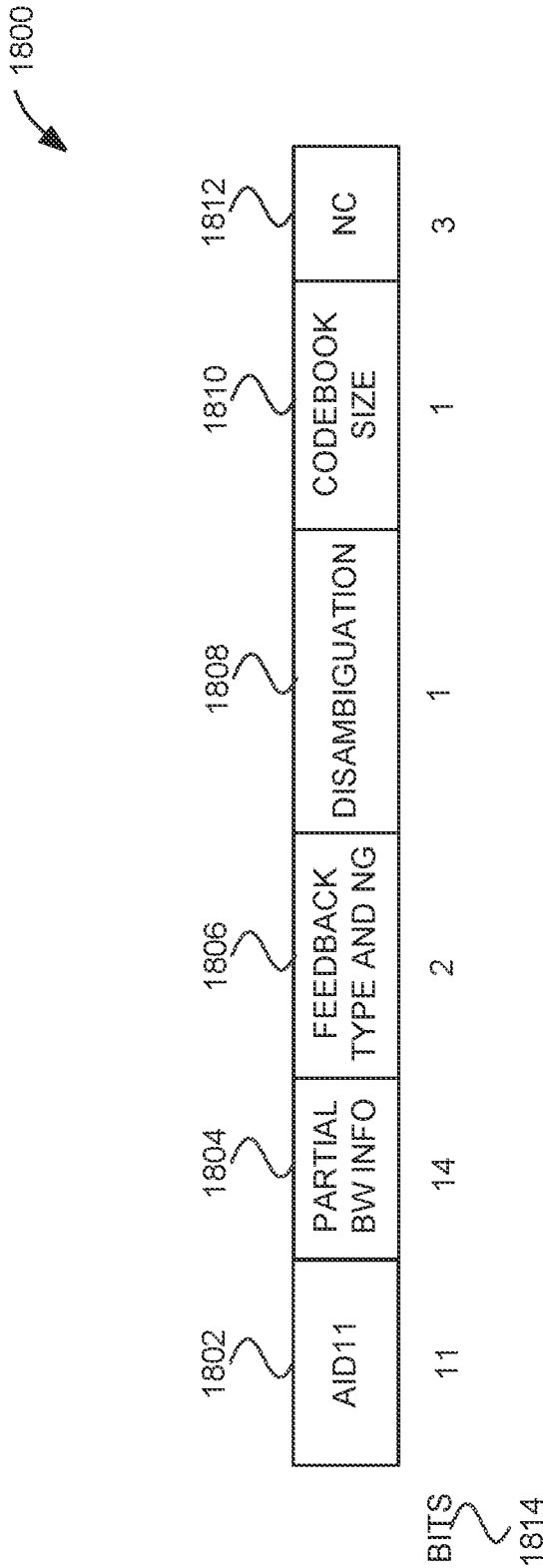
FIG. 18 illustrates a portion of a HE NDP announcement (NDPA) frame, in accordance with some embodiments.
Figure 19:
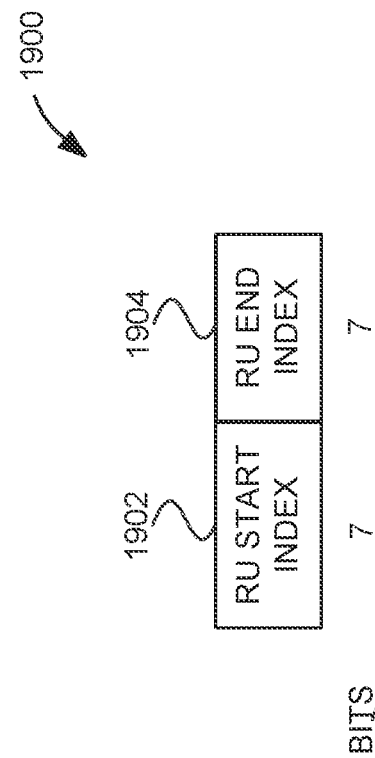
FIG. 19 illustrates a partial bandwidth (BW) subfield, in accordance with some embodiments.

FIG. 18 illustrates a portion of a HE NDP announcement (NDPA) frame 1800, in accordance with some embodiments. Illustrated in FIG. 18 is AID11 1802, partial BW information 1804, feedback type and N$_G$ 1806, disambiguation 1808, codebook size 1810, and N$_C$ 1812. FIG. 19 illustrates a partial bandwidth (BW) subfield, in accordance with some embodiments. FIG. 19 illustrates RU start index 1902 and RU end index 1904. Partial BW subfield 1900 may be the same or similar as partial BW information 1804.

A 20 MHz-only STA 1402, 1502, 1602, 1702, may receive the partial BW info subfield 1804, 1900 in a NDPA frame (not illustrated). The partial BW info subfield 1804, 1900 includes the RU start index 1902 and RU end index 1904 of the channel for which the HE AP 502 (beamformer) is requesting CSI feedback. Each of RU start index field 1902 and RU end index field 1904 has 7 bits, in accordance with some embodiments. 20 MHz-only STA 1402, 1502, 1602, 1702 receive the NDP (not illustrated) in the 20 MHz band where they are camped. There are only 9 RUs in a 20 MHz band.

In some embodiments, when the HE AP 504 transmits the single NDP, e.g., FIGS. 14 and 15, the RU is indexed based on 40 MHz, 80 MHz or 160 MHz. When HE AP 502 sets the partial BW info subfield 1804 for each 20 MHz-only STA 1402, 1502, 1602, 1702, the RU start index 1902 and RU end index 1904 should correspond to the 20 MHz band that the device camps on, and the edge RU should not be included. When the 20 MHz only STAs 1402, 1502, 1602, 1702 prepare the beamforming feedback, the DC RU should be skipped. In some embodiments, when the HE AP 504 transmits a separate NDP for each 20 MHz channel, the HE AP 502 sets the partial BW info subfield 1804, 1900 for each 20 MHz-only STA 1402, 1502, 1602, 1702 based on the RU index for 20 MH band (e.g., the 20 MHz band may have an index relative to 40 MHz, 80 MHz, 80+80 MHz, 160 MHz, etc.). After the 20 MHz-only STA 1402, 1502, 1602, 1702 decoding the partial BW info subfield 1804, 1900, it will know for which RUs out of the 20 MHz band it should prepare the beamforming feedback.

Example A is an apparatus of a HE AP, the apparatus comprising memory; and processing circuitry coupled to the memory, the processing circuitry configured to: encode a null data packet announce (NDPA) packet for one or more HE stations; encode a NDPs in accordance with the NDPA, wherein the NDPs comprise a plurality of NDPs one for each 20 MHz of band; and configure the HE AP to transmit the NDP on each of the 20 MHz of the band, wherein the HE AP is configured not to transmit energy on DC tones or edge tones, and wherein each 20 MHz NDP of the NDPs comprises a pattern of DC tones and edge tones.

Example B is an apparatus of a high-efficiency (HE) access point (AP), the apparatus comprising memory; and processing circuitry coupled to the memory, the processing circuitry configured to: encode a null data packet announcement (NDPA) packet for one or more HE stations; encode a NDP in accordance with the NDPA, wherein the NDP comprises a plurality DC tones and edge tones for each 20 MHz of band; and configure the HE AP to transmit the NDP on the band, wherein the HE AP is configured not to transmit energy on DC tones or edge tones.

Figure 20:
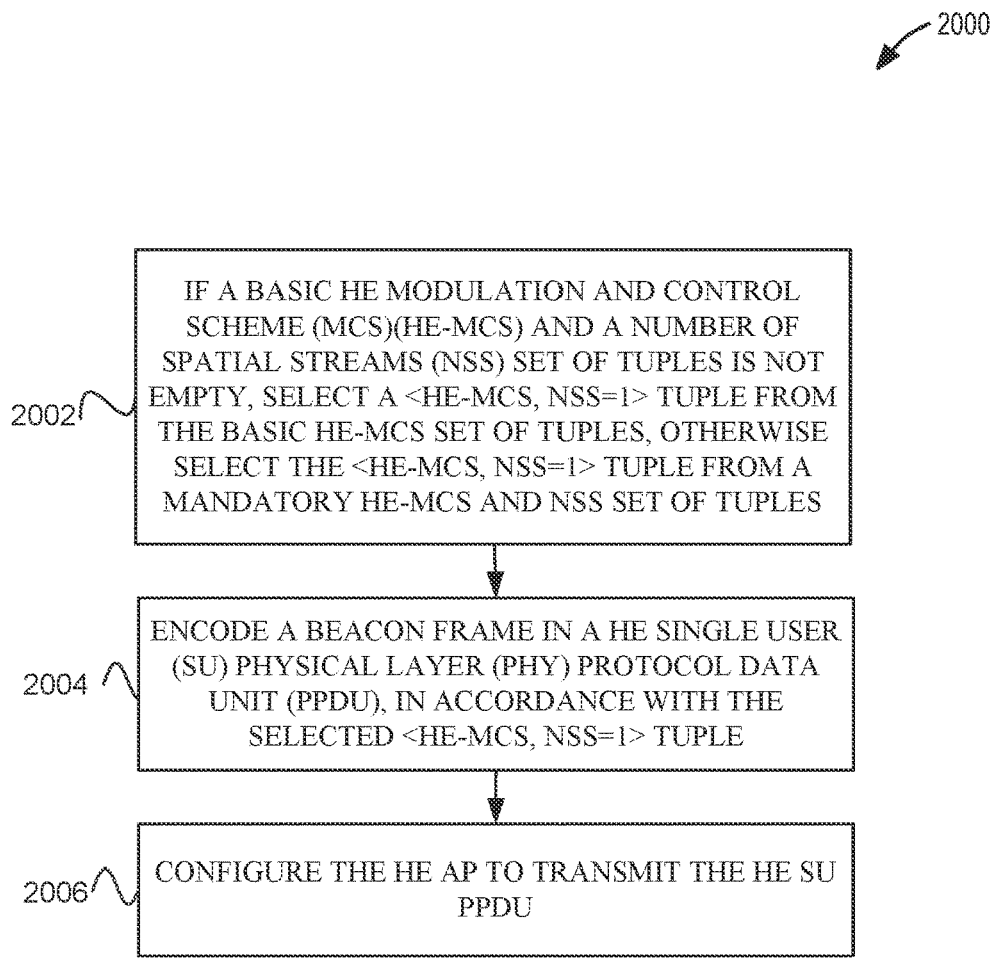
FIG. 20 illustrates a method for HE beacons, in accordance with some embodiments.

FIG. 20 illustrates a method 2000 for HE beacons, in accordance with some embodiments. The method 2000 may begin at operation 2002 with if a basic HE-MCS and NSS set of tuples is not empty, selecting a <HE-MCS, NSS=1> tuple from the basic HE-MCS set of tuples, otherwise selecting the <HE-MCS, NSS=1> tuple from a mandatory HE-MCS and NSS set of tuples. For example, HE AP 504 (FIG. 8) may determine whether basic HE-MCS and NSS set 1200 is empty, and if it is not then select a <HE-MCS, NSS=1> tuple from basic HE-MCS and NSS set. If basic HE-MCS and NSS set 1200 is empty then the HE AP 504 selects a <HE-MCS, NSS=1> tuple from the mandatory HE-MCS and NSS set 1300.

The method 2000 may continue at operation 2004 with encoding a beacon frame in a HE SU PPDU, in accordance with the selected <HE-MCS, NSS=1> tuple. For example, HE AP 502 (FIG. 8) may encode a HE SU PPDU 1000 with a beacon frame 808, 1028 in accordance with the selected <HE-MCS, NSS=1> tuple. The HE SU PPDU 1000 may be for HE BSS 802.3. The method 2000 may continue at operation 2006 with configuring the HE AP 504 to transmit the HE SU PPDU 1000. For example, an apparatus (e.g., a portion of 700) of the HE AP 504 may configure the HE AP 504 to transmit the HE SU PPDU 1000.

The method 2000 may include one or more additional operations. One or more of the operations of method 2000 may be optional. The operations of method 2000 may be performed in a different order, in accordance with some embodiments.

Example 1 is an apparatus of a high-efficiency (HE) access point (AP), the apparatus including memory; and processing circuitry coupled to the memory, the processing circuitry configured to: if a basic HE modulation and control scheme (MCS) (HE-MCS) and a number of spatial streams (NSS) set of tuples is not empty, select a <HE-MCS, NSS=1> tuple from the basic HE-MCS set of tuples, otherwise select the <HE-MCS, NSS=1> tuple from a mandatory HE-MCS and NSS set of tuples; encode a beacon frame in a HE single user (SU) physical layer (PHY) protocol data unit (PPDU), in accordance with the selected <HE-MCS, NSS=1> tuple; and configure the HE AP to transmit the HE SU PPDU.

In Example 2, the subject matter of Example 1 includes, where configure the HE AP further comprises: configure the HE AP to transmit the HE SU PPDU on a 6 GHz band.

In Example 3, the subject matter of Examples 1-2 includes, where the processing circuitry is further configured to: encode a second beacon frame using a basic MCS in a non-high-throughput (non-HT) PPDU; and configure the HE AP to transmit the non-HT PPDU on a 2.4 GHz band or a 5 GHz band.

In Example 4, the subject matter of Example 3 includes, where the beacon frame is for a BSS and where the beacon frame comprises operating parameters for the BSS. In Example 5, the subject matter of Examples 1-4 includes, where encode the beacon frame further comprises: encode a second beacon frame in a HE multi-user (MU) PPDU, in accordance with the selected tuple; and configure the HE AP to transmit the HE MU PPDU.

In Example 6, the subject matter of Examples 1-5 includes, where the processing circuitry is further configured to: encode a second beacon frame in a HE multi-user (MU) PPDU, in accordance with the selected tuple, the second beacon frame to comprise the basic HE-MCS and NSS set of tuples; and configure the HE AP to transmit the HE MU PPDU.

In Example 7, the subject matter of Examples 1-6 includes, where the beacon frame is for a HE BSS and where the beacon frame comprises operating parameters for the HE BSS, the operating parameters including a HE operation element.

In Example 8, the subject matter of Examples 1-7 includes, where encode the beacon frame in the HE SU PPDU further comprises: encode the beacon frame in a single media access control (MAC) protocol data unit (MPDU) (S-MDPU), in accordance with the selected tuple; and encode the S-MDPU in a data portion of the beacon frame, in accordance with the selected tuple.

In Example 9, the subject matter of Examples 1-8 includes, where configure the HE AP to transmit the HE SU PPDU further comprises: configure the HE AP to encode and transmit the HE SU PPDU in accordance with the following parameter setting: CH_BANDWIDTH set to CBW20, a HE_LTF_TYPE set to 2×HE-LTF, a GI_TYPE LTF and GI_TYPE set to 3u2s_GI, a FEC_CODING set to BCC_CODING, a STBC set to 0, a DCM set to 0, a DOPPLER set to 0, a BEAMFORMED set to 0, a NUM_STS set to 1, a NOMINAL_PACKET_PADDING set to 16 µs, and a NO_SIG_EXTN set to true, where CH is an abbreviation for channel, CBW is an abbreviation for channel bandwidth, LTF is an abbreviation for long-training field, GI is an abbreviation for guard interval, FEC is an abbreviation for forward error correction, BCC is an abbreviation for binary convolution codes, STBC is an abbreviation for space-time block coding, DCM is an abbreviation for dual carrier modulation, STS is an abbreviation for space time streams, and SIG_EXTN is an abbreviation for signal extension.

In Example 10, the subject matter of Examples 1-9 includes, where the processing circuitry is further configured to: encode a second beacon frame in a HE extended range (ER) PPDU, in accordance with the selected tuple, the second beacon frame to comprise the basic HE-MCS and NSS set of tuples; and configure the HE AP to transmit the HE ER PPDU.

In Example 11, the subject matter of Example 10 includes, where the beacon frame is for a HE BSS and where the beacon frame comprises operating parameters for the HE BSS, the operating parameters including a HE operation element. In Example 12, the subject matter of Examples 1-11 includes, where the beacon frame is to configure HE stations (STA) to operate in a HE BSS.

In Example 13, the subject matter of Examples 1-12 includes, where the HE AP is configured to operate in accordance with one or more of the following communication standards: an Institute of Electrical and Electronic Engineers (IEEE) 802.11ax, an IEEE 802.11 extremely-high throughput (EHT), IEEE 802.11az, and IEEE 802.11. In Example 14, the subject matter of Examples 1-13 includes, transceiver circuitry coupled to the processing circuitry; and one or more antennas coupled to the transceiver circuitry.

Example 15 is a method performed by an apparatus of a high-efficiency (HE) access point (AP), the method including: if a basic HE modulation and control scheme (MCS) (HE-MCS) and a number of spatial streams (NSS) set of tuples is not empty, selecting a tuple from the basic HE-MCS set of tuples, otherwise selecting the tuple from a mandatory HE-MCS and NSS set of tuples; encoding a beacon frame in a HE single user (SU) physical layer (PHY) protocol data unit (PPDU), in accordance with the selected tuple; and configuring the HE AP to transmit the HE SU PPDU. In Example 16, the subject matter of Example 15 includes, where configuring the HE AP further comprises: configuring the HE AP to transmit the HE SU PPDU on a 6 GHz band.

Example 17 is a non-transitory computer-readable storage medium that stores instructions for execution by one or more processors of an apparatus of a high-efficiency (HE) access point (AP), the instructions to configure the one or more processors to: if a basic HE modulation and control scheme (MCS) (HE-MCS) and a number of spatial streams (NSS) set of tuples is not empty, select a tuple from the basic HE-MCS set of tuples, otherwise select the tuple from a mandatory HE-MCS and NSS set of tuples; encode a beacon frame in a HE single user (SU) physical layer (PHY) protocol data unit (PPDU), in accordance with the selected tuple; and configure the HE AP to transmit the HE SU PPDU.

In Example 18, the subject matter of Example 17 includes, GHz band. In Example 19, the subject matter of Examples 17-18 includes, where the instructions further configure the one or more processors to: encode a second beacon frame using a basic MCS in a non-high-throughput (non-HT) PPDU; and configure the HE AP to transmit the non-HT PPDU on a 2.4 GHz band or a 5 GHz band.

In Example 20, the subject matter of Examples 17-19 includes, where the beacon frame is for a BSS and where the beacon frame comprises operating parameters for the BSS. Example 21 is an apparatus of a high-efficiency (HE) access point (AP), the apparatus including: means for selecting a tuple from the basic HE-MCS set of tuples, otherwise select the tuple from a mandatory HE-MCS and NSS set of tuples, if a basic HE modulation and control scheme (MCS) (HE-MCS) and a number of spatial streams (NSS) set of tuples is not empty; means for encoding a beacon frame in a HE single user (SU) physical layer (PHY) protocol data unit (PPDU), in accordance with the selected tuple; and means for configuring the HE AP to transmit the HE SU PPDU.

In Example 22, the subject matter of Example 21 includes, where configure the HE AP further comprises: configure the HE AP to transmit the HE SU PPDU on a 6 GHz band. In Example 23, the subject matter of Examples 1-22 includes, where the apparatus further comprises: means for encoding a second beacon frame using a basic MCS in a non-high-throughput (non-HT) PPDU; and means for configuring the HE AP to transmit the non-HT PPDU on a 2.4 GHz band or a 5 GHz band.

In Example 24, the subject matter of Example 23 includes, where the beacon frame is for a BSS and where the beacon frame comprises operating parameters for the BSS. In Example 25, the subject matter of Examples 21-24 includes, where means for encoding the beacon frame further comprises: means for encoding a second beacon frame in a HE multi-user (MU) PPDU, in accordance with the selected tuple; and means for configuring the HE AP to transmit the HE MU PPDU.

In Example 26, the subject matter of Examples 21-25 includes, where the apparatus further comprises: means for encoding a second beacon frame in a HE multi-user (MU) PPDU, in accordance with the selected tuple, the second beacon frame to comprise the basic HE-MCS and NSS set of tuples; and means for configuring the HE AP to transmit the HE MU PPDU.

In Example 27, the subject matter of Examples 21-26 includes, where the beacon frame is for a HE BSS and where the beacon frame comprises operating parameters for the HE BSS, the operating parameters including a HE operation element.

In Example 28, the subject matter of Examples 21-27 includes, where means for encoding the beacon frame in the HE SU PPDU further comprises: means for encoding the beacon frame in a single media access control (MAC) protocol data unit (MPDU) (S-MDPU), in accordance with the selected tuple; and means for encoding the S-MDPU in a data portion of the beacon frame, in accordance with the selected tuple.

In Example 29, the subject matter of Examples 21-28 includes, where means for configuring the HE AP to transmit the HE SU PPDU further comprises: means for configuring the HE AP to encode and transmit the HE SU PPDU in accordance with the following parameter setting. CH_BANDWIDTH set to CBW20, a HE_LTF_TYPE set to 2×HE-LTF, a GI_TYPE LTF and GI_TYPE set to 3u2s_GI, a FEC_CODING set to BCC_CODING, a STBC set to 0, a DCM set to 0, a DOPPLER set to 0, a BEAMFORMED set to 0, a NUM_STS set to 1, a NOMINAL_PACKET_PADDING set to 16 µs, and a NO_SIG_EXTN set to true, where CH is an abbreviation for channel, CBW is an abbreviation for channel bandwidth, LTF is an abbreviation for long-training field, GI is an abbreviation for guard interval, FEC is an abbreviation for forward error correction, BCC is an abbreviation for binary convolution codes, STBC is an abbreviation for space-time block coding, DCM is an abbreviation for dual carrier modulation, STS is an abbreviation for space time streams, and SIG_EXTN is an abbreviation for signal extension.

In Example 30, the subject matter of Examples 1-29 includes, where the apparatus further comprises: means for encoding a second beacon frame in a HE extended range (ER) PPDU, in accordance with the selected tuple, the second beacon frame to comprise the basic HE-MCS and NSS set of tuples; and means for configuring the HE AP to transmit the HE ER PPDU.

In Example 31, the subject matter of Example 30 includes, where the beacon frame is for a HE BSS and where the beacon frame comprises operating parameters for the HE BSS, the operating parameters including a HE operation element.

In Example 32, the subject matter of Examples 1-31 includes, where the beacon frame is to configure HE stations (STA) to operate in a HE BSS. Example 33 is at least one machine-readable medium including instructions that, when executed by processing circuitry, cause the processing circuitry to perform operations to implement of any of Examples 1-32.

Example 34 is an apparatus including means to implement of any of Examples 1-32. Example 35 is a system to implement of any of Examples 1-32. Example 36 is a method to implement of any of Examples 1-32.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising memory; and
   processing circuitry coupled to the memory, the processing circuitry configured to:
   select a high-efficiency (HE) modulation and control scheme (MCS) (HE-MCS), number of spatial streams (NSS) (HE-MCS, NSS) tuple from a mandatory HE-MCS and NSS=1;
   encode a HE single user (SU) physical layer (PHY) protocol data unit (PPDU), in accordance with the selected (HE-MCS, NSS) tuple; and
   configure the AP to transmit a beacon frame in the HE SU PPDU when operating in a 6 GHz band.

2. The apparatus of claim 1 wherein when the beacon frame is transmitted in the HE SU PPDU, the HE SU PPDU is sent as a single media access control (MAC) protocol data unit (MPDU) (S-MDPU) in accordance with the selected (HE-MCS, NSS=1) tuple.

3. The apparatus of claim 1 wherein to configure the HE AP to transmit the HE SU PPDU, the processing circuitry is to further:
   configure the HE AP to encode the HE SU PPDU in accordance with the following parameter setting:
   CH_BANDWIDTH set to CBW20, a HE_LTF_TYPE set to 2×HE-LTF, and GI_TYPE set to 3u2s_GI, wherein CH is an abbreviation for channel, CBW is an abbreviation for channel bandwidth, LTF is an abbreviation for long-training field, and GI is an abbreviation for guard interval.

4. The apparatus of claim 1 wherein to configure the HE AP to transmit the HE SU PPDU, the processing circuitry is to further:
   configure the HE AP to encode the HE SU PPDU in accordance with the following parameter setting:
   a FEC_CODING set to BCC_CODING, a STBC set to 0, a DCM set to 0, a DOPPLER set to 0, a BEAMFORMED set to 0, a NOMINAL_PACKET_PADDING set to 16 µs, and a NO_SIG_EXTN set to true, wherein FEC is an abbreviation for forward error correction, BCC is an abbreviation for binary convolution codes, STBC is an abbreviation for space-time block coding, DCM is an abbreviation for dual carrier modulation, and SIG_EXTN is an abbreviation for signal extension.

5. The apparatus of claim 1, wherein the processing circuitry is configured to refrain from configuring the AP to transmit the beacon frame in the HE SU PPDU when the AP is not operating in the 6 GHz band.

6. The apparatus of claim 1 wherein the beacon frame is a first beacon frame, wherein the <HE-MCS, NSS> tuple is a first <HE-MCS, NSS> tuple, and wherein the processing circuitry is further configured to:
select a second (HE-MCS, NSS) tuple from the mandatory HE-MCS and NSS=1;
encode a second beacon frame in a HE extended range (ER) SU PPDU, in accordance with the selected second (HE-MCS, NSS) tuple; and
configure the AP to transmit the HE ER SU PPDU.

7. The apparatus of claim 6 wherein the processing circuitry is further configured to:
encode the second beacon frame in a single media access control (MAC) protocol data unit (MPDU) (S-MDPU), in accordance with the selected second (HE-MCS, NSS) tuple.

8. The apparatus of claim 1 wherein the beacon frame is a first beacon frame and wherein the processing circuitry is further configured to:
encode a second beacon frame using a basic MCS in a non-high-throughput (non-HT) PPDU; and
configure the AP to transmit the non-HT PPDU on a 2.4 GHz band or a 5 GHz band.

9. The apparatus of claim 1 further comprises:
encode the beacon frame in the S-MDPU, in accordance with the selected (HE-MCS, NSS) tuple; and
encode the S-MDPU in a data portion of the HE SU PPDU, in accordance with the selected (HE-MCS, NSS) tuple.

10. The apparatus of claim 1 wherein the beacon frame is a first beacon frame, and wherein the processing circuitry is further configured to:
encode a second beacon frame in a HE extended range (ER) PPDU, in accordance with a selected (HE-MCS, NSS) tuple; and
configure the AP to transmit the HE ER PPDU on a 2.4 GHz band or a 5 GHz band.

11. The apparatus of claim 1 wherein the beacon frame is for a basic service set (BSS), the beacon frame comprises operating parameters for the BSS, and the beacon frame comprises a destination address that indicates it is addressed to a group of stations.

12. The apparatus of claim 1 wherein the processing circuitry comprises a field-programmable gate array (FPGA).

13. The apparatus of claim 1, wherein the processing circuitry comprises one or more application specific integrated circuits (ASICs).

14. The apparatus of claim 1 wherein the AP is configured to operate in accordance with one or more of the following communication standards: an Institute of Electrical and Electronic Engineers (IEEE) 802.11ax, an IEEE 802.11be, IEEE 802.11az, and IEEE 802.11.

15. A method performed by an apparatus of an access point (AP), the method comprising:
selecting a high-efficiency (HE) modulation and control scheme (MCS) (HE-MCS), number of spatial streams (NSS) (HE-MCS, NSS) tuple from a mandatory HE-MCS and NSS=1;
encoding a HE single user (SU) physical layer (PHY) protocol data unit (PPDU), in accordance with the selected (HE-MCS, NSS) tuple; and
configuring the AP to transmit a beacon frame in the HE SU PPDU when operating in a 6 GHz band.

16. The method of claim 1 wherein when the beacon frame is transmitted in the HE SU PPDU, the HE SU PPDU is sent as a single media access control (MAC) protocol data unit (MPDU) (S-MDPU) in accordance with the selected (HE-MCS, NSS=1) tuple.

17. A non-transitory computer-readable storage medium that stores instructions for execution by one or more processors of an apparatus of an access point (AP), the instructions to configure the one or more processors to:
select a high-efficiency (HE) modulation and control scheme (MCS) (HE-MCS), number of spatial streams (NSS) (HE-MCS, NSS) tuple from a mandatory HE-MCS and NSS=1;
encode a HE single user (SU) physical layer (PHY) protocol data unit (PPDU), in accordance with the selected (HE-MCS, NSS) tuple; and
configure the AP to transmit a beacon frame in the HE SU PPDU when operating in a 6 GHz band.

18. The apparatus of claim 17 wherein when the beacon frame is transmitted in the HE SU PPDU, the HE SU PPDU is sent as a single media access control (MAC) protocol data unit (MPDU) (S-MDPU) in accordance with the selected (HE-MCS, NSS=1) tuple.

19. The non-transitory computer-readable storage medium of claim 17, wherein the instructions further configure the one or more processors to:
configure the HE AP to encode the HE SU PPDU in accordance with the following parameter setting: CH_BANDWIDTH set to CBW20, a HE_LTF_TYPE set to 2×HE-LTF, and GI_TYPE set to 3u2s_GI, wherein CH is an abbreviation for channel, CBW is an abbreviation for channel bandwidth, LTF is an abbreviation for long-training field, and GI is an abbreviation for guard interval.

20. The non-transitory computer-readable storage medium of claim 17, wherein the instructions further configure the one or more processors to:
configure the HE AP to encode the HE SU PPDU in accordance with the following parameter setting: a FEC_CODING set to BCC_CODING, a STBC set to 0, a DCM set to 0, a DOPPLER set to 0, a BEAMFORMED set to 0, a NOMINAL_PACKET_PADDING set to 16 μs, and a NO_SIG_EXTN set to true, wherein FEC is an abbreviation for forward error correction, BCC is an abbreviation for binary convolution codes, STBC is an abbreviation for space-time block coding, DCM is an abbreviation for dual carrier modulation, and SIG_EXTN is an abbreviation for signal extension.

* * * * *